(12) United States Patent
Sochi

(10) Patent No.: US 8,792,119 B2
(45) Date of Patent: Jul. 29, 2014

(54) PRINTING DEVICE AND PRINTING CONTROL METHOD

(75) Inventor: Yoshinori Sochi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 329 days.

(21) Appl. No.: 13/231,279

(22) Filed: Sep. 13, 2011

(65) Prior Publication Data

US 2012/0062949 A1  Mar. 15, 2012

(30) Foreign Application Priority Data

Sep. 15, 2010 (JP) .................................. 2010-207316
Aug. 19, 2011 (JP) .................................. 2011-179918

(51) Int. Cl.
*G06F 3/12* (2006.01)
*G06K 15/00* (2006.01)

(52) U.S. Cl.
USPC .................... 358/1.15; 358/1.13; 358/1.14

(58) Field of Classification Search
None
See application file for complete search history.

(56) References Cited

U.S. PATENT DOCUMENTS

| | | | |
|---|---|---|---|
| 6,179,409 B1* | 1/2001 | Takahashi | 347/43 |
| 6,286,059 B1* | 9/2001 | Sugiura | 710/14 |
| 8,218,172 B2* | 7/2012 | Kato | 358/1.15 |
| 2005/0099660 A1* | 5/2005 | Yada et al. | 358/498 |
| 2011/0076076 A1* | 3/2011 | Ban | 399/364 |
| 2012/0062930 A1* | 3/2012 | Toyazaki | 358/1.14 |
| 2012/0069072 A1* | 3/2012 | Nakata | 347/11 |
| 2012/0069402 A1* | 3/2012 | Konno | 358/1.16 |
| 2013/0070262 A1* | 3/2013 | Konno et al. | 358/1.6 |

FOREIGN PATENT DOCUMENTS

| JP | 2006-11031 | 1/2006 |
|---|---|---|
| JP | 2008-129122 | 6/2008 |

OTHER PUBLICATIONS

U.S. Appl. No. 13/234,562, filed Sep. 16, 2011, Sochi.

* cited by examiner

*Primary Examiner* — Satwant Singh
(74) *Attorney, Agent, or Firm* — Oblon, Spivak, McClelland, Maier & Neustadt, L.L.P.

(57) ABSTRACT

A printing device includes data transfer control units that store an image data transferred from un upper level device into a storage unit and reads out the image data from the storage unit in response to an instruction to start a printing, printing units that print the data onto a recording medium, an output control unit that outputs each image data to a predetermined printing unit, and a printing control unit that instructs the data transfer control units to transfer the stored image data corresponding to one page to the output control unit, when a storage report of the image data corresponding to one page is sent from any of the data transfer control units, and stops a conveyance of the recording medium after any of the printing units completes the printing onto the recording medium under the printing in a case that a predetermined specific trouble occurs.

6 Claims, 24 Drawing Sheets

(TO IMAGE OUTPUT UNIT)

FIG.10

| No | CLASSIFICATION | NAME | DIRECTION (DFE ⇔ PCTL) | CONTENTS |
|---|---|---|---|---|
| 1 | JOB INFORMATION | JOB START | ⇔ | NOTIFICATION OF JOB START / RESPONSE JOB IDENTIFIER (JOBID) COMMUNICATION |
| 2 | | JOB END | ⇔ | NOTIFICATION OF END OF ALL OF PRINTING PROCESSES REQUESTED BY CORRESPONDING JOB / RESPONSE JOB IDENTIFIER (JOBID) COMMUNICATION |
| 3 | | PRINTING PROCESS RECEPTION START | ← | NOTIFY THAT PRINTER CAN RECEIVE PRINTING PROCESS |
| 4 | | PRINTER INFORMATION REQUEST/ NOTIFICATION | ⇔ | NEEDED PRINTER INFORMATION REQUEST / NOTIFICATION |
| 5 | | PRINTING PROCESS START | ⇔ | NOTIFY THAT IMAGE DATA IS PREPARED / RESPONSE OUTPUT ORDER, PAGE (PROCESS) UNIT |
| 6 | PRINTER STATE/ PRINTING PROCESS | PRINTING PROCESS REQUEST | ⇔ | REQUEST PRINTING PROCESS BY PRINTER CONTROLLER / RESPONSE COLOR, PROCESS IDENTIFICATION NUMBER, PLANE IDENTIFICATION NUMBER PLANE UNIT, REQUEST IN REQUEST ORDER OF ENGINE ※BITMAP IS TAKEN FROM ENGINE |
| 7 | | DATA TRANSFER COMPLETION | ↑ | NOTIFY TRANSFER COMPLETION OF REQUESTED PLANE |
| 8 | | DATA RECEPTION COMPLETION | ↓ | NOTIFY RECEPTION COMPLETION OF REQUESTED PLANE |
| 9 | | PRINTING PROCESS COMPLETION | ↑ | COMPLETE PRINTING REQUEST FOR ALL PAGES (PROCESSES) |
| 10 | | PROCESS STATE REPORT | ↓ | NOTIFY PRINTING STATE OF PROCESS ·FEEDING ·DISCHARGING ·PRINTING START |
| 11 | | SC NOTIFICATION ERROR GENERATION/RELEASE | ⇔ ↑ | ACQUIRE/NOTIFY OBSTACLE INFORMATION OF PRINTER NOTIFY OBSTACLE GENERATION/RELEASE OF UPPER LEVEL DEVICE |
| 12 | PRINTING CONDITIONS | PRINTING CONDITION SETTING | ⇔ | PRINTING CONDITION NOTIFICATION/RESPONSE ·PRINTING FORM (BOTH-SIDED PRINTING/SINGLE-SIDED PRINTING) ·PRINTING TYPE (DATA EXISTS/BLANK PAGE) ·FEEDING/DISCHARGING INFORMATION (FEEDING ORIGIN, DISCHARGING DESTINATION) ·PRINTING SURFACE ORDER (SURFACE → BACK SURFACE/ BACK SURFACE → SURFACE) ·PRINTING PAPER SIZE ·PRINT DATA SIZE ·RESOLUTION, GRADATION ·COLOR INFORMATION  ETC. |
| 13 | CONNECTION | REGISTRATION/RELEASE | ⇔ | MUTUAL REGISTRATION / RELEASE OF UPPER LEVEL DEVICE AND PRINTER CONTROLLER |

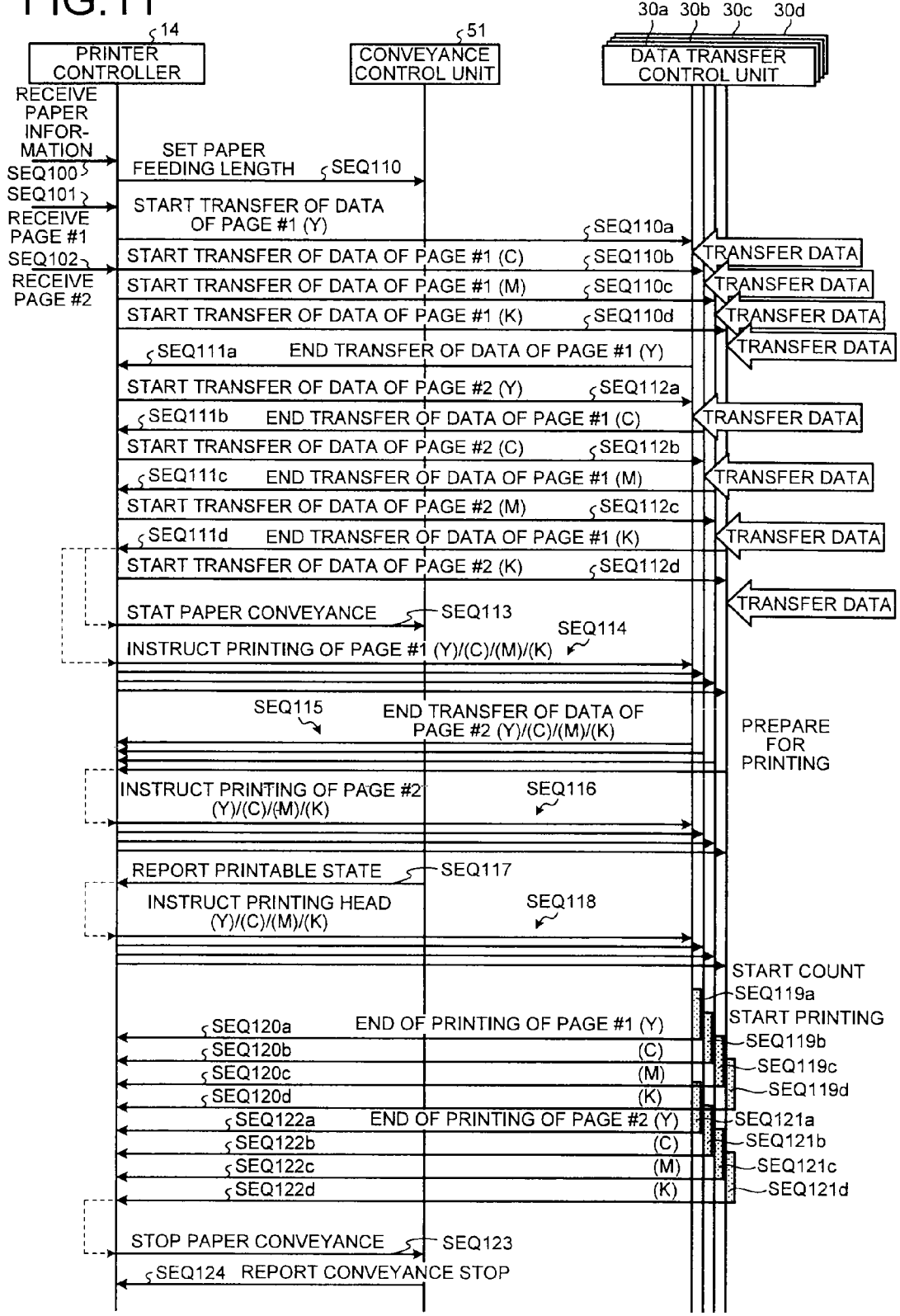

FIG.21

TROUBLE TABLE

| TROUBLE IDENTIFICATION INFORMATION | TROUBLE CONTENTS | TYPE |
|---|---|---|
| A10001 | PAPER SIZE ERROR | SPECIFIC TROUBLE |
| A10002 | JAM (DISCHARGING PORTION) | SPECIFIC TROUBLE |
| A10003 | JAM (FEEDING PORTION) | GENERAL TROUBLE |
| ... | ... | ... |

PRINTING DEVICE AND PRINTING CONTROL METHOD

CROSS-REFERENCE TO RELATED APPLICATIONS

The present application claims priority to and incorporates by reference the entire contents of Japanese Patent Application No. 2010-207316 filed in Japan on Sep. 15, 2010 and Japanese Patent Application No. 2011-179918 filed in Japan on Aug. 19, 2011.

BACKGROUND OF THE INVENTION

1. Field of the Invention

The present invention relates to a printing device and a printing control method.

2. Description of the Related Art

There is known a continuous paper printing system that stops printing at perforations serving as a separation of paper when printing needs to be stopped due to an occurrence of any trouble. For example, there is known a technology in which an improper printing such as a redundant printing can be prevented by performing the cancel operation of the printing for a page to which toner is not yet transferred when the printing request is completed from the printing control unit to the printer engine, in a case of cancelling the printing operation because of any trouble during the printing operation.

For example, Japanese Patent Application Laid-open No. 2008-129122 suggests a technique in which a printing device is provided with a trouble diagnosis unit capable of diagnosing whether the occurred trouble can assure the printing operation, so that the printing operation is stopped in the usual operation without performing a cancel operation. According to this technology, the redundant printing on the paper sheet can be reduced, which may be occurred when a page, for which the printing is stopped by the cancel operation because of the trouble, contacts with an adjacent page to be printed, because of the swing of the paper sheet due to the stop operation of the printing.

However, in the system in which the judgment of the cancel operation is triggered by a cancel instruction from the printing control unit as in Japanese Patent Application Laid-open No. 2008-129122, there is a need for the printing control unit to manage the printing status until the toner attaches onto the paper sheet. Thereby, Japanese Patent Application Laid-open No. 2008-129122 is not applicable to the system in which the sheet conveyance control is independent of the printing data management.

SUMMARY OF THE INVENTION

It is an object of the present invention to at least partially solve the problems in the conventional technology.

According to an aspect of the present invention, there is provided a printing device including one or more data transfer control units that store an image data transferred from un upper level device into a storage unit and reads out the image data from the storage unit in response to an instruction to start a printing, one or more printing units that print the data read out from the storage unit onto a recording medium, an output control unit that outputs each of the image data read out from the storage unit by said one or more data transfer control units to a predetermined printing unit from among said one or more printing units, and a printing control unit that instructs said one or more data transfer units to transfer the stored image data corresponding to one page to the output control unit, when a storage report of the image data corresponding to one page is sent from said one or more data transfer control units, and stops a conveyance of the recording medium after any of said one or more printing units completes the printing onto the recording medium under the printing in a case that a predetermined specific trouble occurs.

According to an aspect of the present invention, there is provided a printing control method including, by one or more data transfer control units, storing an image data transferred from un upper level device into a storage unit and reading out the image data from the storage unit in response to an instruction to start a printing, and by one or more printing units, printing the data read out from the storage unit onto a recording medium, and by an output control unit, outputting each of the image data read out from the storage unit by said one or more data transfer control units to a predetermined printing unit from among said one or more printing units, and by a printing control unit, instructing said one or more data transfer units to transfer the stored image data corresponding to one page to the output control unit, when a storage report of the image data corresponding to one page is sent from said one or more data transfer control units, and by the printing control unit, stopping a conveyance of the recording medium after any of said one or more printing units completes the printing onto the recording medium under the printing in a case that a predetermined specific trouble occurs.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a schematic diagram illustrating an example of control information that is transmitted and received between the upper level device and the printing device controller of the printing device;

FIG. 11 is a sequence diagram conceptually illustrating an example of a printing process applicable to the embodiment of the present invention;

FIG. 21 is a diagram illustrating an example of a trouble table;

DETAILED DESCRIPTION OF THE PREFERRED EMBODIMENTS

Hereinafter, embodiments of a printing device and a printing control method according to the present invention will be described in detail with reference to the accompanying drawings.

A printing device of the present embodiment has a function that immediately stops the printing regardless of perforations when a trouble occurs that cannot assure a successful printing result, and continues to convey paper until the printing of all the spooling pages is completed when a trouble that can assure a successful printing result occurs. Only the pages to be printed at the same time are targets of the printing instruction from a printing control unit that controls the printing process (operation). Because of this, a printing cancellation instruction from the printing control unit to a printer engine needs not to be issued. In addition, by performing the sheet conveyance control at the printing control unit, and by performing the printing data management at the printer engine, it becomes easy to manage the toner attachment status onto the sheet (recording medium) at the printing control unit.

First, in order to help with understanding, a production printing to which a printing system according to each embodiment is applied will be schematically described. In general, the production printing is used when a large capacity of printing is performed in a short time. For this reason, in the production printing, there is constructed a work flow system for controlling from a print data generation to a print distribution, in order to efficiently perform a job control or a print data control, as well as improving the print speed.

The print system according to each embodiment involves a part for implementing the print operation in the work flow for the production printing. In the system, a process using the RIP (hereinafter may be called "RIP process") is performed by a device different from a device for printing the bitmap data obtained through the RIP process. Since the RIP process requires the most long processing time in the printing process, it is possible to improve the print speed by performing the RIP process and the printing process by different devices.

<Outline of Printing System Applicable to Each Embodiment>

Figure 1:
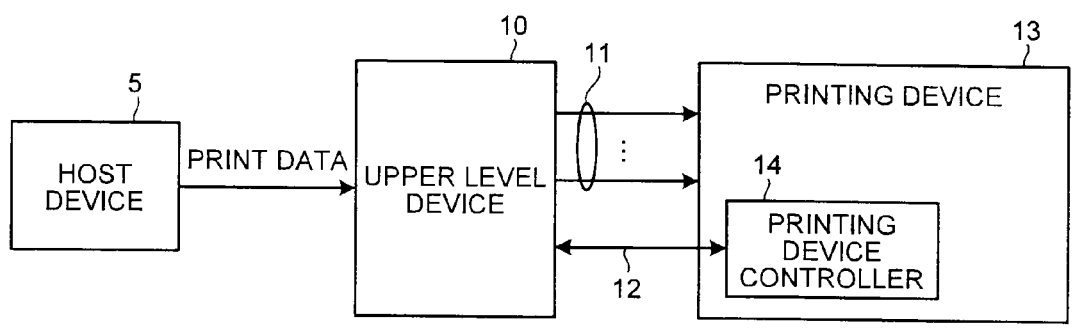
FIG. 1 is a block diagram illustrating an example of the configuration of a printing system applicable to an embodiment of the present invention.

FIG. 1 illustrates an example of the configuration of a printing system that can be applied to the embodiment of the present invention. The printing system is provided with an upper level device 10, a printing device 13 as an image forming device, a plurality of data lines 11, and a control line 12. The upper level device 10 is connected with the printing device 13 via the plurality of data lines 11 and the control line 12. A host device 5 may be a computer for example to generate print job data including print image data and print set information.

The print job data may include data written in PDL (Page Description Language)(hereinafter referred to as "PDL data") for example. The print set information relating to the print setting including print page information, layout information, print run information, as well as the print image data composed of the bitmap image for printing, is generated by interpreting the PDL data.

The upper level device 10 performs the RIP process in accordance with the print job data supplied from the host device 5 to generate the each color bitmap data as print image data. Along with that, the upper level device 10 generates control information for controlling the print operation, on the basis of the print job data and the information from the host device 5.

The print image data for each color generated by the upper level device 10 is supplied to a printer engine unit (not shown) of the printing device 13 through the plurality of data lines 11. Between the upper level device 10 and the printing device controller 14, the control information for controlling the print operation is transmitted/received through the control line 12. The print controller 14 controls the printer engine unit on the basis of the transmitted/received control information to form an image on a print medium, thereby perform the print operation according to the print job. Incidentally, the specific example of the control information will be described later with reference to FIGS. 16 to 18.

The printing method is not limited in particular. However, in each embodiment, printing paper is used as the printing medium and a printing image is formed on the printing paper using an inkjet system. However, the present invention is not limited thereto and each embodiment can be applied to the printing device that forms a printing image on the printing paper using toner. As the printing paper, continuous paper (continuous stationery) where perforations to be cut are provided at a predetermined interval is used. In the production printing, the continuous paper is mainly used as the printing paper. However, the present invention is not limited thereto and cut paper where a size is fixed to an A4 size or a B4 size may be used as the printing paper. In the continuous paper, a page means a region that is interposed by perforations provided at a predetermined interval.

The printing medium that is printed by a printing system according to each embodiment is not limited to printing paper such as paper. That is, other printing media that can be printed by a printing system applied to each embodiment and can be provided as a roll may be used. For example, a plastic film or cloth may be used as the printing medium.

<Upper Level Device>

Figure 2:
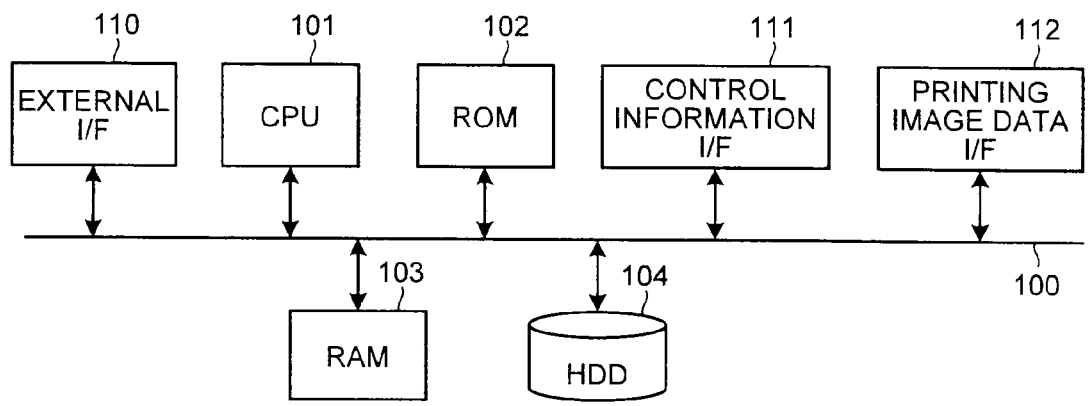
FIG. 2 is a block diagram illustrating an example of the configuration of an upper level device.

FIG. 2 illustrates an example of the configuration of the upper level device 10. A control processing unit (CPU) 101, a read only memory (ROM) 102, a random access memory (RAM) 103, and a hard disk drive (HDD) 104 are connected to a bus 100. An external I/F 110, a control information I/F 111, and a print image data I/F 112 are connected to the bus 100. The individual units that are connected to the bus 100 can communicate with each other through the bus 100.

In the ROM 102 and the HDD 104, a program to operate the CPU 101 is stored in advance. The RAM 103 is used as a work memory of the CPU 101. That is, the CPU 101 uses the RAM 103 as the work memory according to the program stored in the ROM 102 and the HDD 104 and controls all the operations of the upper level device 10.

The external I/F 110 corresponds to, for example, a transmission control protocol/Internet Protocol (TCP/IP) and controls communication with the host device 5. The control information I/F 111 controls communication of control information. Since the print image data I/F 112 controls communication of print image data, the print image data I/F 112 has plural channels. For example, print image data of each color such as yellow (Y), cyan (C), and magenta (M), and black (K) that is generated in the upper level device 10 is output from the plural channels. Since a high-speed transmission speed is required in the print image data I/F 112, the peripheral component interconnect bus express (PCI Express) may be employed. A type of the control information I/F 111 is not limited in particular. However, in this case, similar to the print image data I/F 112, the PCI Express is used.

In this configuration, print job data that is transmitted from the host device 5 is received in the external I/F 110 of the upper level device 10 and is stored in the HDD 104 through the CPU 101. The CPU 101 executes the RIP process on the basis of the print job data read from the HDD 104, generates bitmap data of each color, and writes the bitmap data in the RAM 103. For example, the CPU 101 renders page description language (PDL) data by the RIP process, generates bitmap data of each color, and writes the bitmap data in the RAM 103. The CPU 101 compresses and encodes the bitmap data of each color that is written in the RAM 103 and temporarily stores the bitmap data in the HDD 104.

For example, when a print operation starts in the printing device 13, the CPU 101 reads the compressed and encoded bitmap data of each color from the HDD 104, decodes the compressed code, and writes the extended bitmap data of each color in the RAM 103. The CPU 101 reads the bitmap data of each color from the RAM 103, outputs the bitmap data as the print image data of each color from each channel of the print image data I/F 112, and supplies the bitmap data to the printing device 13. The CPU 101 transmits/receives control information to control printing through the control information I/F 111 between the CPU 101 and the printing device 13, according to a progress situation of the print operation.

Figure 3:
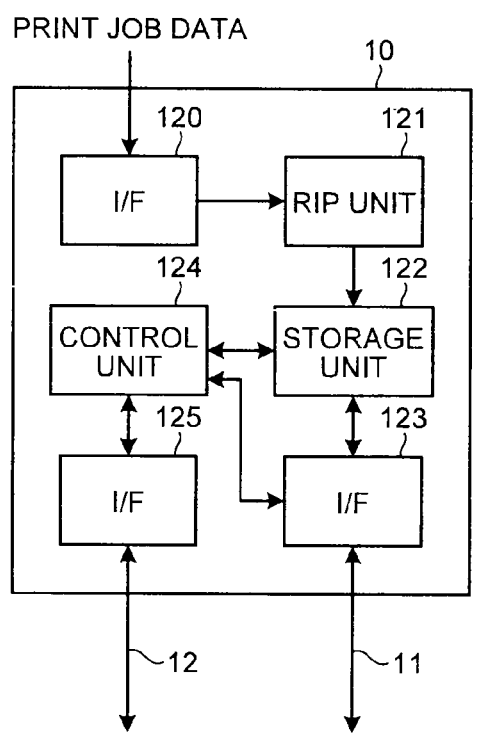
FIG. 3 is a functional block diagram illustrating an example of a function of the upper level device.

FIG. 3 is a functional block diagram illustrating an example of a function of the upper level device 10. The upper level device 10 includes interfaces (I/F) 120, 123, and 125, an RIP unit 121, a storage unit 122, and a control unit 124. The interfaces 120, 123, and 125 correspond to the external I/F 110, the print image data I/F 112, and the control information I/F 111 in FIG. 2, respectively. The RIP unit 121 and the control unit 124 are configured by a program operating on the CPU 101 in FIG. 3. The storage unit 122 corresponds to at least one of the RAM 103 or the HDD 104 in FIG. 3.

The print job data that includes the PDL data is generated by the host device 5 and is transmitted to the upper level device 10. The print job data is received in the interface 120 and is supplied to the RIP unit 121. The RIP unit 121 performs rendering on the basis of the PDL data included in the supplied print job data and generates print image data based on the bitmap data of each color of Y, C, M, and K. The RIP unit 121 sequentially stores the generated print image data of each color of Y, C, M, and K in the storage unit 122.

The control unit 124 communicates with the printing device controller 14 of the printing device 13 through the interface 125. For example, the control unit 124 generates control information to control printing in the printing device 13, on the basis of the print job data supplied from the host device 5 through the interface 120. The control information is transmitted from the control unit 124 to the printing device controller 14 through the interface 125.

The interface 123 is configured to have independent access to the print image data of each color of Y, C, M, and K stored in the storage unit 122. The interface 123 is connected to the printing device 13 through the plurality of data lines 11 corresponding to the individual colors of Y, C, M, and K, and exchanges control information related to print image data transfer of each color of Y, C, M, and K between the interface 123 and the printing device 13 or transmits print image data of each color of Y, C, M, and K.

<Printing Device>

Figure 4:
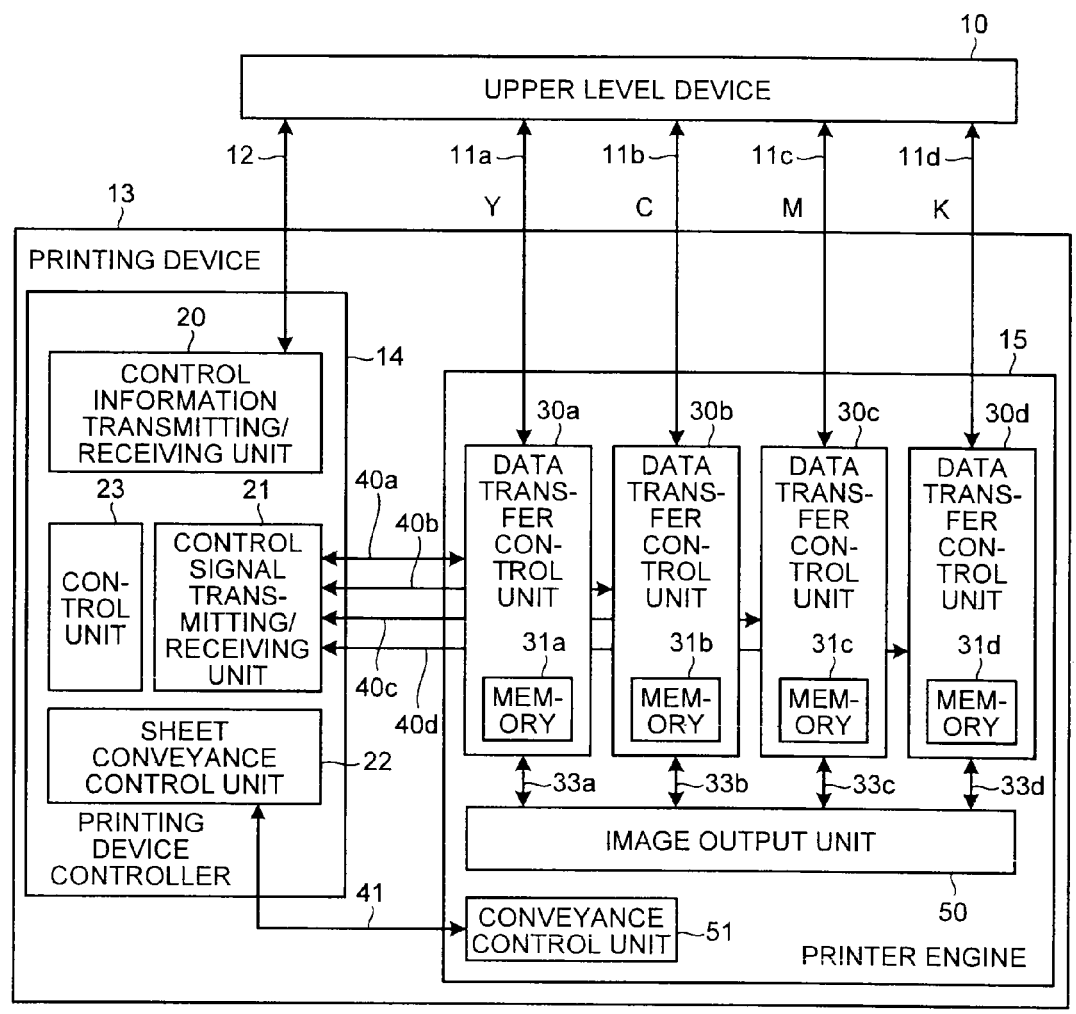
FIG. 4 is a block diagram illustrating an example of the configuration of a printing device.

FIG. 4 illustrates an example of the configuration of the printing device 13. The printing device 13 includes a printing device controller 14 and a printer engine 15. The printing device controller 14 is connected to the control line 12, and exchanges control information with the upper level device 10 through the control line 12 to control a print operation. The printer engine 15 is connected to the plurality of data lines 11a, 11b, 11c, and 11d and executes a printing process of print image data of each color that is transmitted from the upper level device 10 through the data lines 11a, 11b, 11c, and 11d according to the control of the printing device controller 14.

The printing device controller 14 and the printer engine 15 will be described in more detail. The printing device controller 14 includes a control information transmitting/receiving unit 20, a control signal transmitting/receiving unit 21, a paper conveyance control unit 22, and a control unit 23.

The control information transmitting/receiving unit 20 exchanges control information to control printing with the upper level device 10 through the control line 12. The control signal transmitting/receiving unit 21 is connected to data transfer control units 30a, 30b, 30c, and 30d to be described below through engine I/F control lines 40a, 40b, 40c, and 40d. The control signal transmitting/receiving unit 21 exchanges a control signal individually with the data transfer control units 30a, 30b, 30c, and 30d. The paper conveyance control unit 22 is connected to a conveyance control unit 51 to be described below through a conveyance control line 41 and exchanges a control signal with the conveyance control unit 51 to control paper conveyance.

The control unit 23 includes a CPU, a ROM, and a RAM, and uses the RAM as a work memory to control the individual units of the printing device controller 14 according to a program previously stored in the ROM. The control unit 23 analyzes control information that is transmitted from the upper level device 10 and is received by the control information transmitting/receiving unit 20 and delivers the control information to the control signal transmitting/receiving unit 21 or the paper conveyance control unit 22.

The control information transmitting/receiving unit 20, the control signal transmitting/receiving unit 21, and the paper conveyance control unit 22 may be configured as hardware controlled by the control unit 23 and may be configured as a program module that operates on the control unit 23.

Figure 5:
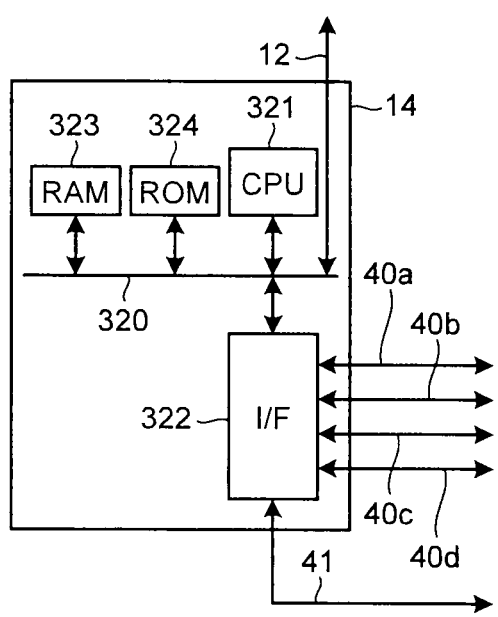
FIG. 5 is a block diagram illustrating an example of the configuration of a printing device controller.

FIG. 5 illustrates an example of the hardware configuration of the printing device controller 14. The printing device controller 14 includes a CPU 321, an interface (I/F) 322, a RAM 323, and a ROM 324. The CPU 321, the interface (I/F) 322, the RAM 323, and the ROM 324 are connected to a bus 320 such that they can communicate with each other. To the bus 320, a control line 12 is also connected through a communication I/F not illustrated in the drawings. The CPU 321 operates using the RAM 323 as the work memory according to the program stored in the ROM 324 and controls all the operations of the printing device 13. The interface 322 includes a logic circuit that is configured in a hardware manner and controls communication with a printing device controller 14, data transfer control units 30a, 30b, 30c, and 30d and a conveyance control unit 51.

In this configuration, for example, functions of the control signal transmitting/receiving unit 21 and the paper conveyance control unit 22 illustrated in FIG. 4 are realized by the I/F 322. The function of the control unit 23 is realized by the program operated on the CPU 321. The function of the control information transmitting/receiving unit 20 is realized by a communication I/F not illustrated in the drawings and the bus 320.

Returning to the description of FIG. 4, the printer engine 15 includes the plurality of data transfer control units 30a, 30b, 30c, and 30d that have the same configuration, an image output unit 50 that outputs an image based on the print image data to paper and forms an image, and a conveyance control unit 51 that controls conveyance of printing paper.

The data lines 11a, 11b, 11c, and 11d are connected to the data transfer control units 30a, 30b, 30c, and 30d, respectively. The data transfer control units 30a, 30b, 30c, and 30d include memories 31a, 31b, 31c, and 31d, respectively, and store the print image data of the individual colors transmitted from the upper level device 10 through the data lines 11a, 11b, 11c, and 11d in the memories 31a, 31b, 31c, and 31d.

Each of the memories 31a, 31b, 31c, and 31d has the same memory capacity and the same address configuration. Each of the memories 31a, 31b, 31c, and 31d preferably has the memory capacity that can store print image data of at least three pages. For example, the three pages of the print image data correspond to print image data of a page during transmission from the upper level device 10, print image data of a page during an output, and print image data of the next page. However, the present invention is not limited thereto and each of the memories 31a, 31b, 31c, and 31d may store print image data of two pages or less.

The data transfer control units 30a, 30b, 30c, and 30d are connected to the control signal transmitting/receiving unit 21 by engine I/F control lines 40a, 40b, 40c, and 40d, respectively. The control signal transmitting/receiving unit 21 can transmit/receive a control signal between the data transfer control units 30a, 30b, 30c, and 30d through the engine I/F control lines 40a, 40b, 40c, and 40d.

Figure 6:
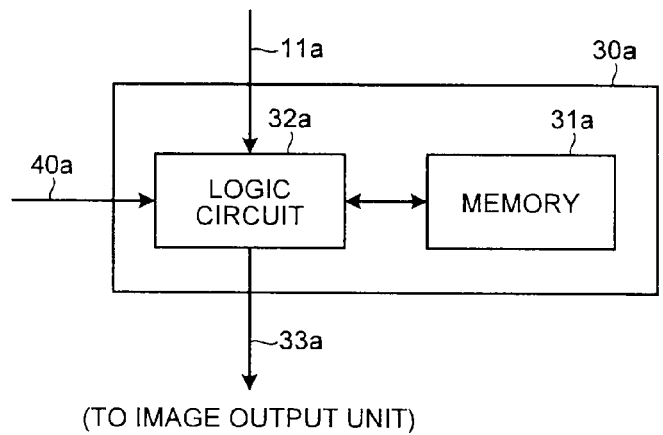
FIG. 6 is a block diagram schematically illustrating an example of the configuration of a data transfer control unit.

FIG. 6 schematically illustrates an example of the configuration of the data transfer control unit 30a. Since the common configuration is applied to the data transfer control units 30a, 30b, 30c, and 30d, the configuration of the data transfer control unit 30a from among the data transfer control units 30a, 30b, 30c, and 30d is illustrated representatively in FIG. 6.

The data transfer control unit 30a includes a memory 31a and a logic circuit 32a. The engine I/F control line 40a and the data line 11a are connected to the logic circuit 32a. The logic circuit 32a stores the print image data transmitted from the upper level device 10 through the data line 11a in the memory 31a, according to the control signal received from the control signal transmitting/receiving unit 21 through the engine I/F control line 40a. Likewise, the logic circuit 32a reads the print image data from the memory 31a according to a control signal received from the control signal transmitting/receiving unit 21 through the engine I/F control line 40a and supplies the print image data to an image output unit 50 to be described through an output line 33a.

The control by the logic circuit 32a that is configured in a hardware manner with a combination of logic circuits is advantageous in that a high-speed process can be executed, over the control by a CPU which uses interrupts to make a program diverge into processes. For example, the logic circuit 32a performs logic determination with respect to a control signal based on a bit string that is received through the engine I/F control line 40a and determines a process to be executed. However, the present invention is not limited thereto and the same function as that of the logic circuit 32a may be realized in a software manner using the CPU.

The print image data of the individual colors that are output from the data transfer control units 30a, 30b, 30c, and 30d is supplied to the image output unit 50. The image output unit 50 executes printing based on the print image data of each color. In each embodiment, printing of the print image data is performed by an inkjet system that ejects ink from nozzles in heads and performs printing. However, the printing system is not limited to the inkjet system and a laser printer system may be used.

Figure 7:
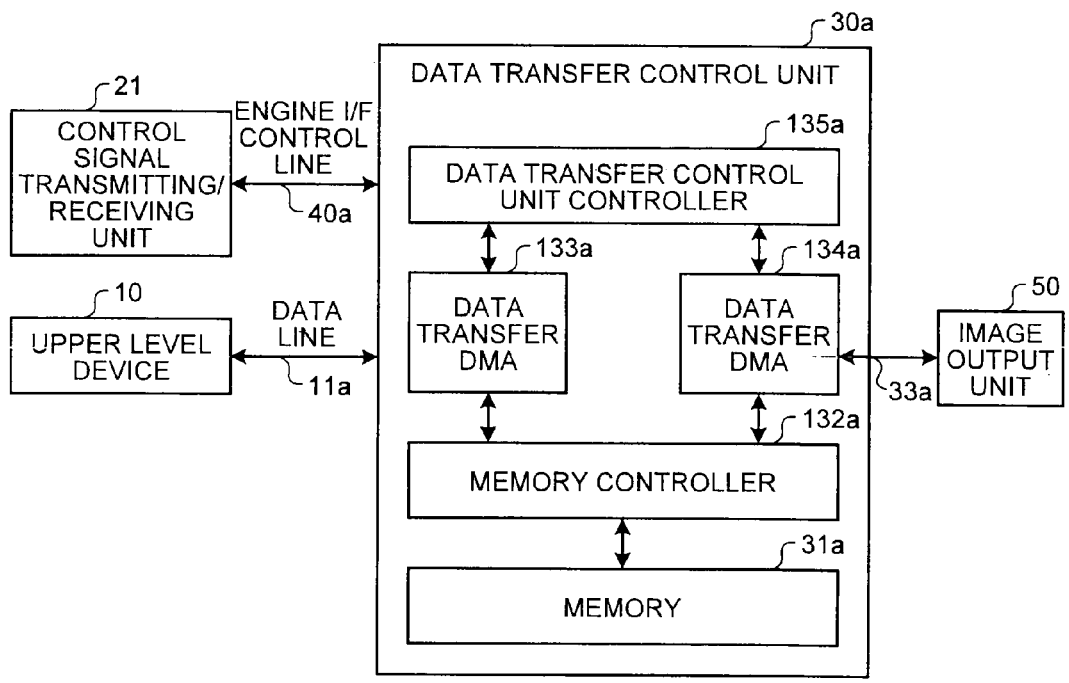
FIG. 7 is a block diagram specifically illustrating an example of the configuration of the data transfer control unit.

FIG. 7 specifically illustrates an example of the configuration of the data transfer control unit 30a. In FIG. 7, components that are common to those of FIG. 6 are denoted by the same reference numerals and the redundant description will not be repeated. The data transfer control unit 30a includes a memory 31a, a memory controller 132a, data transfer direct memory accesses (DMA) 133a and 134a, and a data transfer control unit controller 135a. Among these components, the memory controller 132a, the data transfer DMAs 133a and 134a, and the data transfer control unit controller 135a are included in the logic circuit 32a illustrated in FIG. 6.

The memory controller 132a controls access with respect to the memory 31a. The data transfer DMA 133a receives print image data from the upper level device 10 and writes the print image data in the memory through the memory controller 132a. The data transfer DMA 134a reads data from the memory 31a through the memory controller 132a and transmits the data to the image output unit 50 through the output line 33a. The data transfer control unit controller 135a receives control information that is transmitted from the control signal transmitting/receiving unit 21 in the printing device controller 14 through the engine I/F control line 40a and controls the data transfer DMAs 133a and 134a according to the received control information.

For example, once a data transfer start request transmitted from the control signal transmitting/receiving unit 21 is received in the data transfer control unit controller 135a through the engine I/F control line 40a, the data transfer control unit controller 135a instructs the data transfer DMA 133a to start to transmit data, according to the data transfer start request. The data transfer DMA 133a transmits the data transfer request to the upper level device 10 through the data line 11a according to the instruction. For example, the data that is transmitted from the upper level device 10 according to the data transfer request is received in the data transfer DMA 133a and is written at a predetermined address of the memory 31a through the memory controller 132a.

Once the printing instruction that is transmitted from the control signal transmitting/receiving unit 21 is received in the data transfer control unit controller 135a through the engine I/F control line 40a, the data transfer control unit controller 135a instructs the data transfer DMA 134a to read data from the memory 31a. The data transfer DMA 134a reads data from the memory 31a through the memory controller 132a, according to the instruction. The data transfer DMA 134a transmits the read data to the image output unit 50 through the output line 33a.

Figure 8:
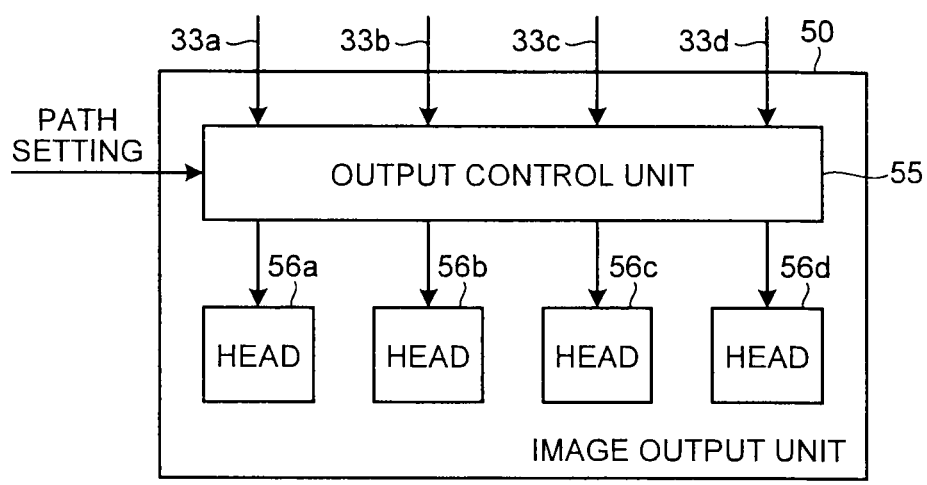
FIG. 8 is a block diagram illustrating an example of the configuration of an image output unit.

FIG. 8 illustrates an example of the configuration of the image output unit 50. The image output unit 50 includes an output control unit 55 and heads 56a, 56b, 56c, and 56d of the individual colors of Y, C, M, and K. A relation between the colors and the heads 56a, 56b, 56c, and 56d is not limited to the above example. The output control unit 55 controls connection of output lines 33a, 33b, 33c, and 33d to which print image data of the data transfer control units 30a, 30b, 30c, and 30d is output and the heads 56a, 56b, 56c, and 56d. That is, the output control unit 55 can set a path such that each of the heads 56a, 56b, 56c, and 56d is connected to any one output line selected from the output lines 33a, 33b, 33c, and 33d.

For example, the output control unit 55 may set the output lines 33a, 33b, 33c, and 33d and the heads 56a, 56b, 56c, and 56d to be connected in a one-to-one relation. Further, the output lines 33a, 33b, 33c, and 33d may be set to be connected to the heads 56a, 56b, 56c, and 56d in a one-to-many relation, such that the heads 56a, 56b, 56c, and 56d are connected to the output line 33a.

Paths to connect the output lines 33a, 33b, 33c, and 33d with the heads 56a, 56b, 56c, and 56d may be set by an operation from the user using a DIP switch. However, the present invention is not limited thereto and the paths may be set by a control signal from the control signal transmitting/receiving unit 21.

As described above, in the printing device 13 according to each embodiment, transmission of the print image data from the upper level device 10 and transmission/reception of a control signal to control printing of the print image data between the upper level device 10 and the printing device 13 are performed through different paths. The print image data of the individual colors is transmitted from the upper level device 10 through the different data lines 11a, 11b, 11c, and 11d and the print image data of the individual colors that is transmitted through the data lines 11a, 11b, 11c, and 11d is independently controlled and is supplied to the data transfer control units 30a, 30b, 30c, and 30d that have the same configuration. Further, in the image output unit 50, connection paths of outputs of the data transfer control units 30a, 30b, 30c, and 30d and the heads 56a, 56b, 56c, and 56d of the individual colors can be set by a user operation or the like.

Therefore, the printing device 13 according to each embodiment can easily change the configuration of the printer engine 15, according to the number of colors of the print image data (four colors of Y, C, M, and K or only color of K) or the number of heads used by the image output unit 50. At this time, the printer engine 15 may be provided with only the necessary units among the data transfer control units 30a, 30b, 30c, and 30d according to the required configuration.

For example, in a case of performing a full-color printing with four colors Y, C, M, and K, all of the data transfer control units 30a, 30b, 30c, and 30d may be provided in the printer engine 15. In the output control unit 55, the outputs of the data transfer control units 30a, 30b, 30c, and 30d may be connected to the heads 56a, 56b, 56c, and 56d, respectively. For example, in a case of performing a mono-color printing with only color K, it may be configured from a cost viewpoint that only the data transfer control unit 30a is provided with only the head 56a. And, in the output control unit 55, the output of the data transfer control unit 30a can be connected to the head 56a. Alternatively, in the case of performing the mono-color printing with the only color K, it may be configured form a speed viewpoint that only the data transfer control unit 30a is provided with four heads 56a, 56b, 56c and 56d. And, in the output control unit 55, the output of the data transfer control unit 30a can be connected to four heads 56a, 56b, 56c and 56d. In this case, the same color is printed overlappingly a plurality of times. Therefore, for example, a high speed printing may be realized by shortening the ejection time of ink from heads 56a, 56b, 65c and 56d respectively to ¼ of the usual ejection time and increasing the conveyance speed of sheet paper to quadruple of the usual conveyance speed.

<Conveyance System of Printing Paper>

Figure 9:
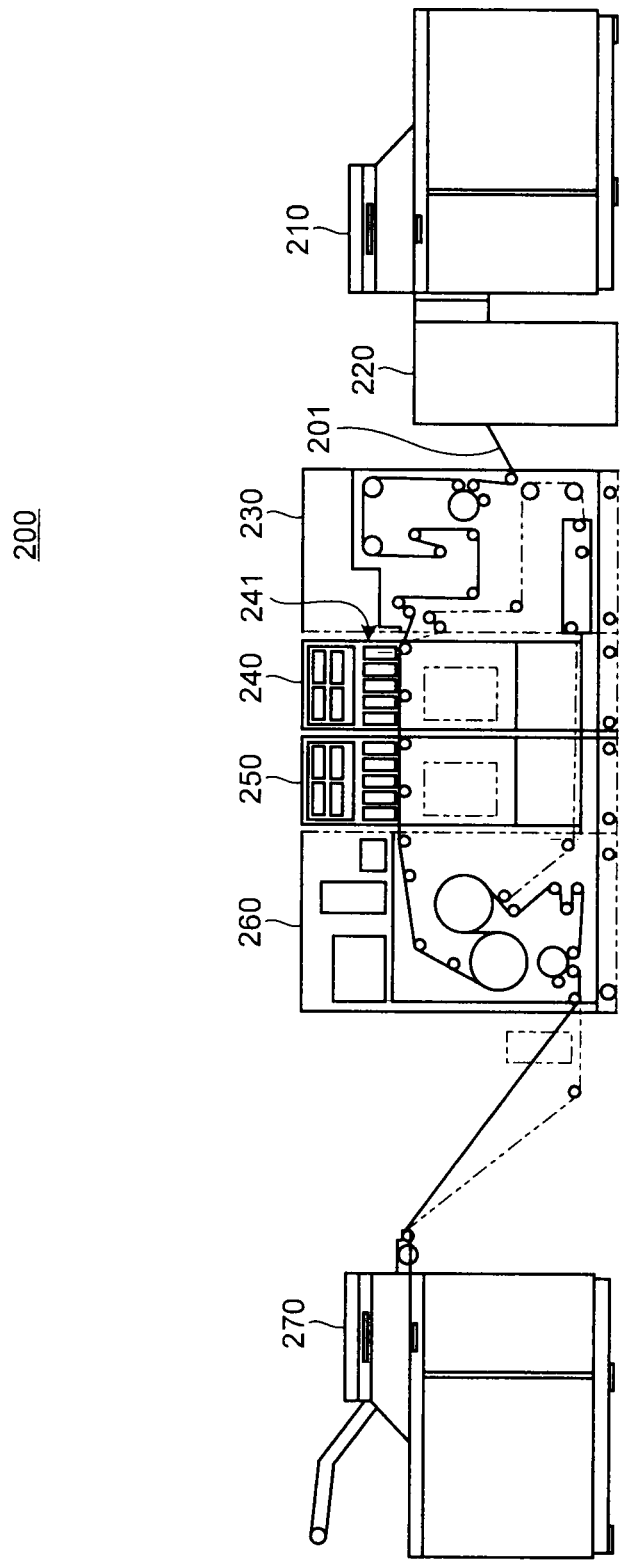
FIG. 9 is a schematic diagram schematically illustrating an example of the configuration of a printing device including a conveyance system of paper applicable to the embodiment of the present invention.

Referring to FIG. 4, the conveyance control unit 51 is connected to the paper conveyance control unit 22 by the conveyance control line 41 and controls conveyance of paper to which an image is formed by the image output unit 50 on the basis of the print image data. FIG. 9 schematically illustrates an example of the configuration of a printing device 200 that includes a conveyance system of paper that can be applied to each embodiment of the present invention. As described above, in each embodiment, the printing device 200 uses continuous paper as printing paper.

Printing paper 201 is fed from a printing paper feeding unit 210 to a first conveyance unit 230 through a power supply operation box 220. In the first conveyance unit 230, the printing paper 201 is conveyed through plural rollers by conveyance control of the conveyance control unit 51, is aligned, and is fed to printer engine units 240 and 250 that correspond to the printer engine 15.

In a printing unit 241 that corresponds to the image output unit 50, the printer engine units 240 and 250 perform printing according to print image data with respect to the printing paper 201 fed from the first conveyance unit 230. The printing paper 201 where the printing ends is discharged from the printer engine unit 250 by the conveyance control of the conveyance control unit 51 and is fed to a second conveyance unit 260. The printed paper 201 is conveyed to a predetermined position by the second conveyance unit 260 to be discharged, and is fed to a cutting unit 270. The printed paper 201 is cut by the cutting unit 270 according to perforations and divided into individual pages.

In this case, the printing paper continuously exists even in a path until the printing paper 201 is discharged from the second conveyance unit 260 after printing is performed on the printing paper 201 in the printer engine units 240 and 250, in order for the printing device 200 to perform printing on the printing paper 201 which is the continuous paper.

The configuration that includes the first conveyance unit 230, the printer engine units 240 and 250, and the second conveyance unit 260 is additionally prepared, the printed paper 201 that is discharged from the second conveyance unit 260 disposed on the front side is reversed and fed to the first conveyance unit 230 disposed on the rear side, and both-sided printing with respect to the printing paper 201 can be performed.

<Detail of Printing Process Applicable to Each Embodiment>

Next, a printing process applicable to each embodiment will be further described in detail. FIG. 10 illustrates an example of control information that is transmitted/received between the upper level device 10 and the printing device controller 14 of the printing device 13 through the control line 12. In FIG. 10, the upper level device 10 is illustrated as a digital front end processor (DFE) and the printing device controller 14 is illustrated as a PCTL. The control information roughly includes (i) job information, (ii) information indicating a printer status and a printing process, (iii) information indicating a printing condition, and (iv) information indicating a connection.

The job information is used to notify a job start and a job end. The job start includes a notification of the job start with respect to the printing device controller 14 from the upper level device 10 and a response from the printing device 13 to the upper level device 10 with respect to the notification. The job end includes a notification of an end of all of the printing processes that are requested by the job start with respect to the printing device controller 14 from the upper level device 10 and a response from the printing device controller 14 to the upper level device 10 with respect to the notification. At the time of a response in the job start and the job end, a job identifier (JOBID) to identify a job is transmitted from the printing device controller 14 to the upper level device 10.

The information indicating a printer status and a printing process includes a printing process reception start notification, a request/notification of printer information, a printing process start notification, a printing process request, a data transfer completion notification, a data reception completion notification, a printing process completion notification, a process status report, a service control (SC) notification, and an error occurrence and removal notification.

As for the printing process reception start notification, the printing device 13 notifies the upper level device 10 that the printing device controller 14 is ready to receive a printing process. The request/notification of printer information includes a request of necessary printer information from the upper level device 10 to the printing device controller 14, as well as a response to the request from the printing device controller 14 to the upper level device 10.

The printing process start notification includes a notification from the upper level device 10 to the printing device controller 14 indicating that the preparation of the print image data is completed and a response to the notification from the printing device 13 to the upper level device 10. The notification indicating that the preparation of the print image data is completed is notified in accordance with the sequence of the output of the print image data, page-by-page (process-by-process). It can be said that the page is a print unit by which a series of printing operation is performed.

The printing process request includes a notification of printing process from the printing device controller 14 to the upper level device 10 and a response to the notification from the upper level device 10 to the printing device controller 14. The printing device controller 14 notifies the upper level device 10 of color information (yellow, cyan, magenta, or black) indicating the colors Y, C, M, and K to perform printing, a process identification number (process ID), and a plane identification number. Incidentally, the plane corresponds to each image based on each color print image data to be printed in one page. The printing device controller 14 notifies these kinds of information for every plane in accordance with the sequence of requests from engine, i.e. the data transfer control units 30a, 30b, 30c and 30d. That is, the printer engine 15 retrieves the print image data composed of bitmap data from the upper level device 10.

As for the data transfer completion notification, the completion of transferring the print image data as for the requested plane is notified from the upper level device 10 to the printing device controller 14. As for the data reception completion notification, the completion of receiving the print image data as for the requested plane is notified from the printing device controller 14 to the upper level device 10. As for the printing process completion notification, the completion of print request for all pages (process) is notified from the upper level device 10 to the print controller 14. As for the process status report, the print status of pages (process) is notified from the printing device controller 14 to the upper level device 10. At this time, the printing device controller 14 acquires from the printer engine 15 the information about feeding or discharging of sheets or the information about the print start timing, and adds the acquired information to the completion notification. Then, the notification to which the acquired information is added is transmitted to the upper level device 10.

As for the SC notification, an acquisition of obstacle information is requested from the upper level device 10 to the printing device controller 14. The obstacle information acquired according to the request is notified from the printing device controller 14 to the upper level device 10. As for the error occurrence and removal, an occurrence of any error and a removal thereof at the upper level device 10 is notified from the upper level device 10 to the printing device controller 14.

The information indicating printing conditions includes setting the printing conditions, that is, a notification of the printing conditions from the upper level device 10 to the printing device controller 14 and a response from the printing device controller 14 to the notification. Examples of the printing conditions include a printing form, a printing type, feeding/discharging information, printing surface order, a printing paper size, a print data size, resolution and gradation, and color information.

The printing form indicates, for example, whether both-sided printing or a single-sided printing is performed on the printing paper 201. The printing type indicates whether print image data exists and thus the print image data is printed or the print image data does not exist and thus a white page is output without printing the print image data. The feeding/discharging information indicates identification information, such as a stacker of a discharging destination or a feeding origin of the printing paper 201. The printing surface order indicates whether printing is performed from a front surface to a back surface of the printing paper 201 or is performed from the back surface to the front surface. The printing paper size indicates, for example, the length of a page to be printed in a conveyance direction of the printing paper 201, when continuous paper is used as the printing paper 201. The print data size indicates a data size of the print image data. That is, the print data size indicates a size of the print image data corresponding to one page. The resolution and gradation indicates resolution and gradation of the case where the print image data is printed on the printing paper 201. The color information indicates, for example, whether to perform printing using a full color in which the colors Y, C, M, and K are used, or to perform printing using a single color in which only the color K is used.

The information indicating the connection includes registration and release, and specifically includes registration of information in each opponent between the upper level device 10 and the printing device controller 14, and release of the registered information.

<Printing Sequence>

Next, a printing process applicable to each embodiment will be described. FIG. 8 is a sequence diagram conceptually illustrating an example of the printing process that can be applied to each embodiment. In this case, full-color printing using the individual colors Y, C, M, and K is performed. If the printing device controller 14 receives information related to the printing paper 201 as control information from the upper level device 10 (SEQ100), paper feeding length is set to the conveyance control unit 51 on the basis of the received information (SEQ110). The paper feeding length is, for example, a size of one page in a conveyance direction.

If the printing device controller 14 receives control information indicating a job start of a first page (page #1) from the upper level device 10 (SEQ101), the printing device controller 14 requests the data transfer control units 30a, 30b, 30c, and 30d to start data transfer of the first page with respect to the colors Y, C, M, and K (SEQ110a, SEQ110b, SEQ110c, and SEQ110d). The data transfer control unit 30a requests the upper level device 10 to transmit print image data of the first page of the color Y according to the request through the data line 11a, and stores the print image data of the first page of the color Y transmitted from the upper level device 10 in the memory 31a, according to the request.

Similar to the data transfer control unit 30a, the data transfer control units 30b, 30c, and 30d request the upper level device 10 to transmit the print image data of the individual colors C, M, and K of the first page through the data lines 11b, 11c, and 11d according to the requests from SEQ110b, SEQ110c, and SEQ110d. Each of the data transfer control units 30b, 30c, and 30d stores the print image data of the first page of the individual colors C, M, and K transmitted from the upper level device 10 according to the request in the memories 31b, 31c, and 31d.

Meanwhile, in the example of FIG. 8, while the data transfer of the first page is requested from the printing device controller 14 to each of the data transfer control units 30a, 30b, 30c, and 30d, the printing device controller 14 receives control information indicating a job start of the next second page transmitted from the upper level device 10 (SEQ102). The received control information is held in, for example, the RAM 323.

Once the print image data transfer of the first page of each color from the upper level device 10 ends, each of the data transfer control units 30a, 30b, 30c, and 30d notifies the printing device controller 14 of the end of the transmission (SEQ111a, SEQ111b, SEQ111c, and SEQ111d). The printing device controller 14 requests each of the data transfer control units 30a, 30b, 30c, and 30d to start the data transfer of the second page (page #2), in response to the notification (SEQ112a, SEQ112b, SEQ112c, and SEQ112d).

Each of the data transfer control units 30a, 30b, 30c, and 30d requests the upper level device 10 to transmit the print image data of the second page of each color, according to the request, and stores the print image data of the second page of each color transmitted from the upper level device 10 in the memories 31a, 31b, 31c, and 31d, according to the request.

Each of the data transfer control units 30a, 30b, 30c, and 30d can recognize the end of the data transfer on the basis of the data amount of the transmitted print image data. The information indicating the data amount of the printing image corresponding to one page, for example, is added to the head of the print image data by the upper level device 10 and is transmitted, when the data transfer starts with respect to each of the data transfer control units 30a, 30b, 30c, and 30d. In a case that a predetermined unit of the print image data is transferred, it may be configured that the upper level device 10 adds any end information for indicating the completion of transferring one page to the last transferred unit of the print image data corresponding to the end of one page. Alternatively, it may be configured that the upper level device 10 transmits any information for indicating the completion of transferring the print image data corresponding to one page to each transfer control unit 30a, 30b, 30c and 30d independently of the print image data, for example immediately after the print image data corresponding to one page is transferred.

Meanwhile, once the printing device controller 14 receives the notification of the completion of transferring the data of the first page from all of the data transfer control units 30a, 30b, 30c, and 30d, the printing device controller 14 requests the conveyance control unit 51 to start the paper conveyance (SEQ113). The conveyance control unit 51 starts conveyance at a predetermined speed of the printing paper 201 according to the request. The printing device controller 14 requests the conveyance control unit 51 to start the paper conveyance and instructs each of the data transfer control units 30a, 30b, 30c, and 30d to start printing of the first page (SEQ114).

If the printing paper 201 reaches a predetermined position, the conveyance control unit 51 notifies the printing device controller 14 of a printing enabled state (SEQ117). The printing device controller 14 instructs each of the data transfer control units 30a, 30b, 30c and 30d of the print start position, according to the printing enabled state report from the conveyance control unit 51 (SEQ118).

Each of the data transfer control units 30a, 30b, 30c and 30d starts the printing operation according to the print start position instruction. In this example, the heads of the individual colors Y, C, M, and K are arranged in order of the heads 56a, 56b, 56c, and 56d along a conveyance direction of the printing paper 201. In this case, once the print start position of the first page in the printing paper 201 reaches a position to be printed by the head 56a, the data transfer control unit 30a firstly starts reading out the print image data of the first page from the memory 31a. The print image data of the color Y read from the memory 31a is transmitted to the image output unit 50. The print image data is supplied to the head 56a through the output control unit 55 and printing with respect to the printing paper 201 is performed (SEQ119a). Once printing the first page of the color Y is completed, the completed of the printing is notified to the printing device controller 14 (SEQ120a).

Next, once the print start position of the first page in the printing paper 201 reaches a position to be printed by the head 56b, the data transfer control unit 30b starts reading out the print image data of the first page from the memory 31b. The print image data of the color C read from the memory 31b is transmitted to the image output unit 50. The print image data is supplied to the head 56b through the output control unit 55 and printing with respect to the printing paper 201 is performed (SEQ119b). Once printing the first page of the color C ends, the end of the printing is notified to the printing device controller 14 (SEQ120b).

Hereinafter, in the same way as mentioned above, the printing operations with the colors M and K are sequentially started (SEQ119c and SEQ119d). Once the printing operations with the colors M and K are completed, the completion of the printing operation is notified to the printing device controller 14 (SEQ120c and SEQ120d).

Meanwhile, once transferring each color print image data of the second page started at SEQ112a to SEQ112d are completed, each of the data transfer control units 30a, 30b, 30c and 30d notifies the printing device controller 14 of the completion of transferring the data (SEQ115). The printing device controller 14 instructs each of the data transfer control units 30a, 30b, 30c and 30d to start printing the second page, according to the data transfer completion notification (SEQ116).

Each of the data transfer control units 30a, 30b, 30c and 30d starts to print the second page after the completion of printing the first page. For example, when the print start position of the second page in the printing paper 201 reaches a position to be printed by the head 56a after the completion of printing the first page (SEQ120a), the data transfer control unit 30a reads out the print image data of the color Y of the second page from the memory 31a, supplies the print image data to the image output unit 50, and starts printing on the printing paper 201 (SEQ121a). Once the printing operation of the color Y is completed, the completion of the printing operation is notified to the printing device controller 14 (SEQ122a).

In the same way, also in the data transfer control units 30b, 30c, and 30d, when the print start position of the second page reaches each position to be printed by the heads 56b, 56c, and 56d, each color print image data is read from the memories 31b, 31c and 31d, respectively, and printing with respect to the printing paper 201 is started (SEQ121b to SEQ121d). When the printing operation of each color is completed, the completion of the printing operation of each color is notified to the printing device controller 14 (SEQ122b to SEQ122d).

Once the printing device controller 14 receives the printing process completion notification of the color K of the second page from the data transfer control unit 30d, the printing device controller 14 assumes that the printing operation of the final page according to the print job ends and requests the conveyance control unit 51 to stop conveyance of the printing paper 201 (SEQ123). The conveyance control unit 51 stops conveyance of the printing paper 201 according to the request and reports the stop of conveyance to the printing device controller 14 (SEQ124). Thereby, a series of printing processes terminates.

<Detail of Printing Process>

Next, a printing process applicable to each embodiment will be described in detail. In each embodiment, each of the data transfer control units 30a to 30d acquires control information to control printing, from the upper level device 10, under the control of the printing device controller 14. Each of the data transfer control units 30a to 30d stores print image data of each color transmitted from the upper level device 10 in the memories 31a to 31d, under the control of the printing device controller 14.

A data transfer process of the print image data that can be applied to each embodiment will be described using flowcharts of FIGS. 9A to 9D. Hereinafter, the data lines 11a, 11b, 11c, and 11d transmit print image data of the colors Y, C, M and K, respectively, and the data transfer control units 30a, 30b, 30c and 30d control the transfer of the print image data of the colors Y, C, M and K, respectively.

Figure 12:
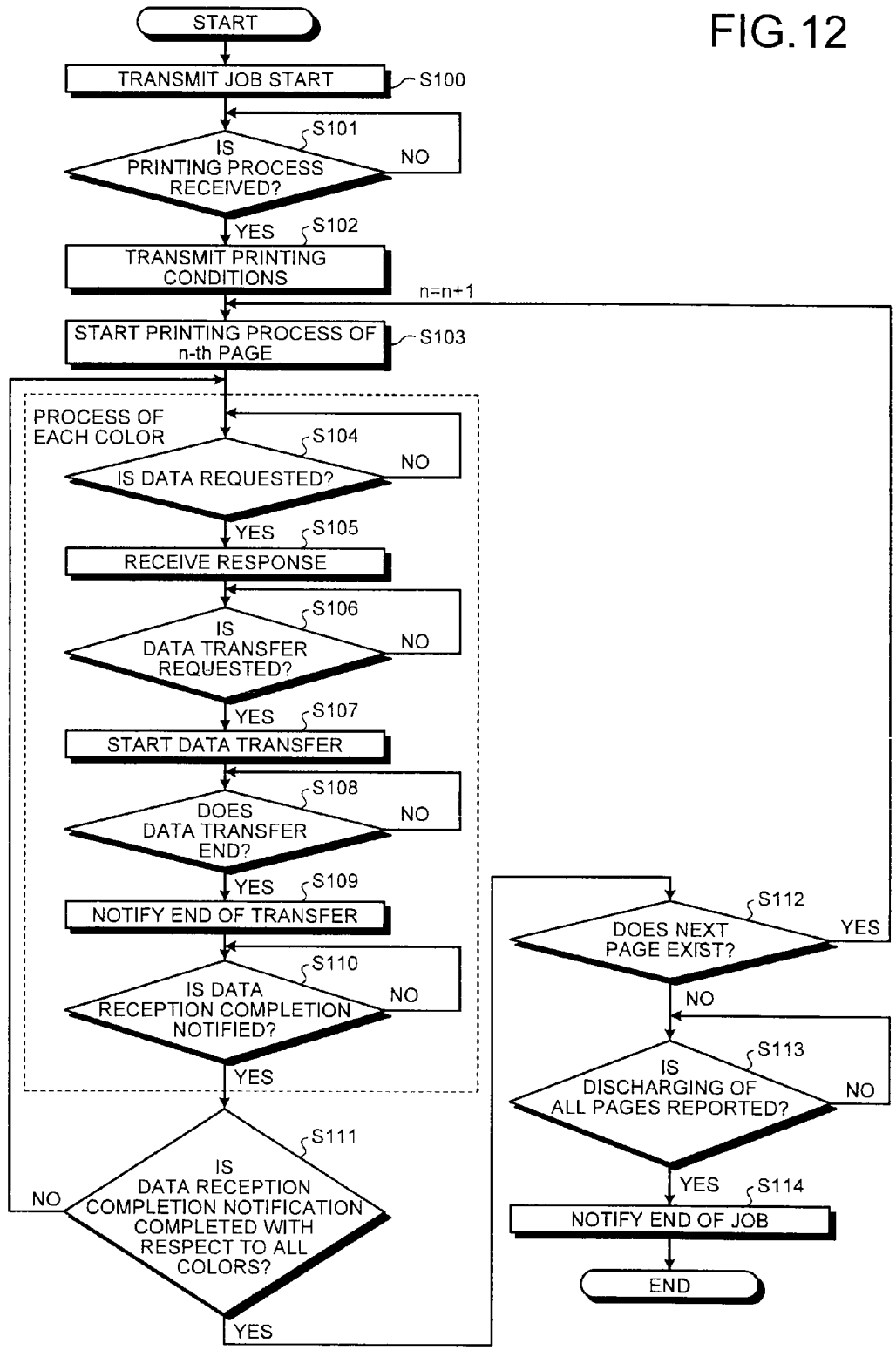
FIG. 12 is a flowchart illustrating an example of a process of the upper level device applicable to the embodiment of the present invention.

FIG. 12 is a flowchart illustrating an example of a process in the upper level device 10 relating to data transfer. Once the upper level device 10 receives job data from the host device 5, the upper level device 10 transmits control information indicating a job start to the printing device controller 14 through the control line 12, in step S100. The upper level device 10 stands by a control signal that is transmitted from the printing device controller 14 in response to the control signal and indicates printing process reception (step S101).

Once the upper level device 10 receives the control signal indicating the printing process reception from the printing device controller 14, the upper level device 10 transmits control information indicating printing conditions in job data to the printing device controller 14 through the control line 12 in step S102. Next, in step S103, the upper level device 10 sets a page number to "n" and transmits a control signal to control a printing process start of the n-th page to the printing device controller 14 through the control line 12. The processes from step S103 to step S112 are executed in a page unit.

The processes of steps S104 to S110 become processes that are executed on the individual colors of Y, C, M, and K. Hereinafter, a process that is related to the color Y will be mainly described. In step S104, the upper level device 10 stands by a request for transmission of the print image data of the color Y from the printing device controller 14. Once the upper level device 10 receives a data transfer request transmitted from the printing device controller 14 through the control line 12, the upper level device 10 returns a response to the received data request to the printing device controller 14 in step S105. Next, in step S106, the upper level device 10 stands by a data transfer request that is transmitted from the data transfer control unit 30a through the data line 11a.

Once the upper level device 10 receives the data transfer request from the data transfer control unit 30a through the data line 11a, the upper level device 10 starts the transfer of the print image data of the color Y with respect to the data transfer control unit 30a in step S107. The print image data of the color Y is transmitted to the data transfer control unit 30a through the data line 11a. At this time, the upper level device 10 adds information indicating a size of the print image data to the transmitted print image data of the color Y.

In step S108, the upper level device 10 stands by the completion of transferring the data corresponding to one page of the color Y. Referring to FIG. 3, the upper level device 10 monitors the storage unit 122 and the interface 123 using the control unit 124 and determines whether transferring the data corresponding to one page is performed with respect to the individual colors Y, C, M, and K. When it is determined that the transfer of the data corresponding to one page of the color Y terminates, the upper level device 10 makes the process proceed to step S109 and the data transfer completion notification indicating that the transfer of the data corresponding to one page terminates is transmitted to the printing device controller 14 through the control line 12. In step S110, the upper level device 10 stands by a data reception completion notification with respect to the color Y, from the printing device controller 14.

In step S111, the upper level device 10 determines whether the data reception completion notification is received for all of the colors Y, C, M, and K. When it is determined that the data reception completion notification is not received, the process returns to step S104 and the upper level device 10 executes a process on the next color.

In FIG. 12, the processes of steps S104 to S110 has been described to be sequentially executed with respect to the individual colors Y, C, M, and K. However, the present invention is not limited thereto. For example, the processes of steps S104 to S110 may be executed in parallel with respect to the individual colors Y, C, M, and K. In this case, in step S111, the upper level device 10 stands by the data reception completion notification in step S110 in the processes of the individual colors Y, C, M, and K.

Once the upper level device 10 determines that the data reception completion notifications is received with respect to all of the colors of Y, C, M, and K in step S111, the upper level device 10 makes the process proceed to step S112 and determines whether a printing process of the next page is executed. The number of pages to be printed can be acquired from the print job data that is received from the host device 5. When it is determined that the printing process of the next page exists, the page number n becomes n+1 and the process returns to step S103.

Meanwhile, when it is determined that transmission of the data corresponding to all of the pages in the print job data terminates, the upper level device 10 makes the process proceed to step S113 and stands by transmission of a discharging report of all of the pages from the printing device controller 14. When the upper level device 10 receives the discharging report of all of the pages from the printing device controller 14, the upper level device 10 makes the process proceed to step S114 and the upper level device 10 transmits a job end notification indicating that all of the print jobs end to the printing device controller 14 through the control line 12.

Figure 13:
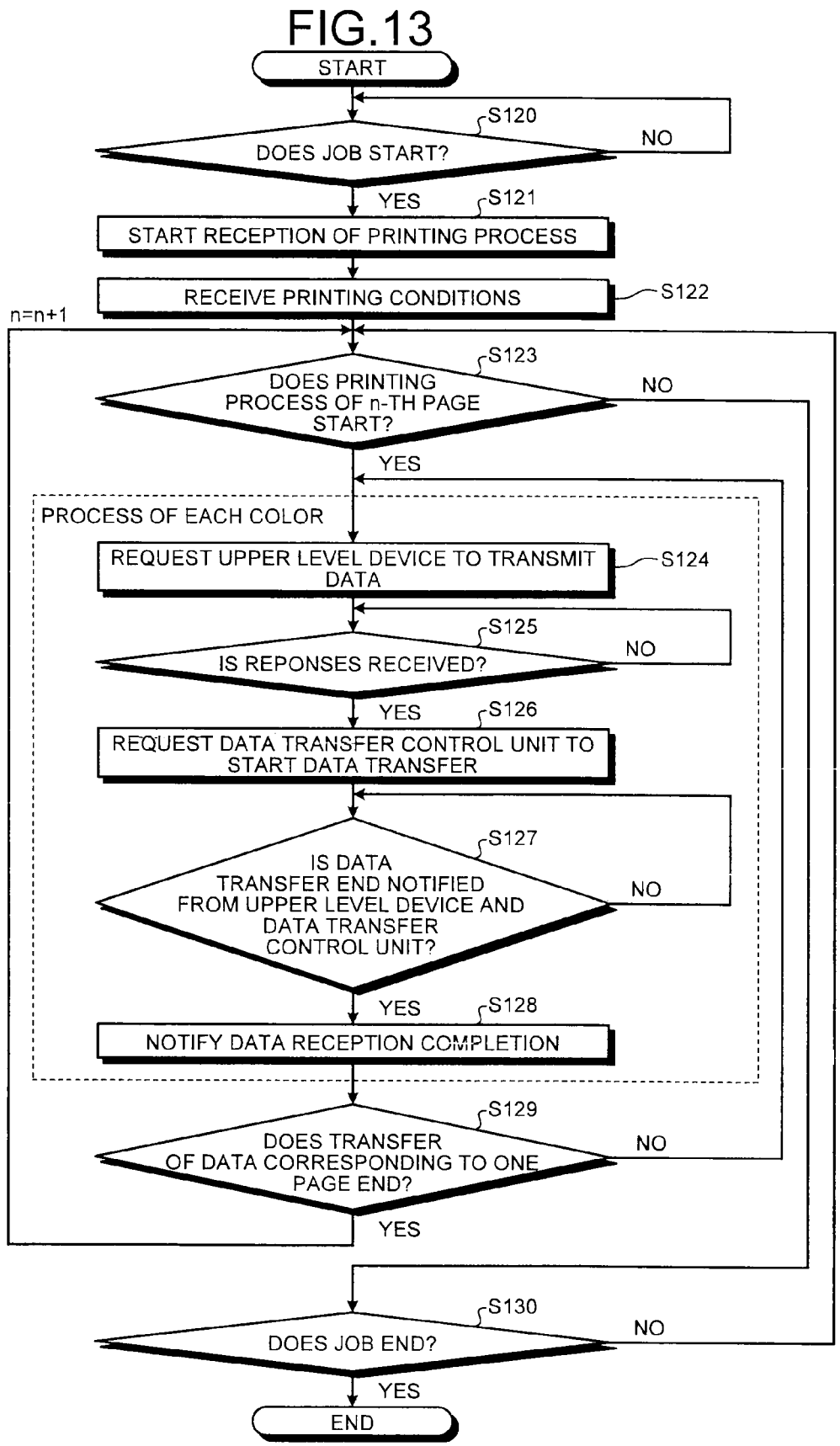
FIG. 13 is a flowchart illustrating an example of a process of a printing device controller applicable to the embodiment of the present invention.

FIG. 13 is a flowchart illustrating an example of a process in the printing device controller 14 relating to the data transfer. In step S120, the printing device controller 14 stands by the control information indicating the job start transmitted from the upper level device 10 through the control line 12. Once the printing device controller 14 receives the control information, the printing device controller 14 returns a response to the upper level device 10 through the control line 12, in the next step S121. In step S121, the printing device controller 14 transmits the control information indicating the printing process reception start to the upper level device 10 through the control line 12. In the next step S122, the printing device controller 14 receives the control information indicating the printing conditions that is transmitted from the upper level device 10 through the control line 12.

In the next step S123, the printing device controller 14 determines whether the control signal transmitted from the upper level device 10 through the control line 12 and indicating the printing process start of the n-th page is received. When it is determined that the control signal is not received, the printing device controller 14 makes the process proceed to step S130 and determines whether the job end notification is received from the upper level device 10 through the control line 12. When it is determined that the job end notification is not received, the process returns to step S123. Meanwhile, when it is determined that the job end notification is received in step S130, a series of printing processes terminates.

In step S123, when it is determined that the control signal transmitted from the upper level device 10 through the control line 12 and indicating the printing process start is received, the printing device controller 14 makes the process proceed to step S124. The subsequent processes of steps S124 to S128 become the processes of the individual colors Y, C, M, and K. In this case, a transfer process of the print image data of the color Y will be described.

In step S124, the printing device controller 14 requests the upper level device 10 to transfer the print image data through the control line 12. Next, in step S125, the printing device controller 14 stands by a response from the upper level device 10 with respect to the request. Once the printing device controller 14 receives the response from the upper level device 10, the printing device controller 14 requests the data transfer control unit 30a to start to transfer the data through the engine I/F control line 40a in step S126.

At this time, the printing device controller 14 extracts a page identifier PBID indicating a page (n-th page) to perform printing and a transfer origin address indicating an address of a transfer origin of the print image data, from a transfer management table to be described below using FIG. 15. The printing device controller 14 adds the extracted page identifier PBID and transfer origin address to the data transfer start request for requesting to start the data transfer and transmits it to the data transfer control unit 30a in next step S126.

In next step S127, the printing device controller 14 stands by the data transfer completion notification from the upper level device 10 and the data transfer completion notification from the data transfer control unit 30a. Once the data transfer completion notification is received from the upper level device 10 and the data transfer control unit 30a through the control line 12 and the engine I/F control line 40a, the printing device controller 14 makes the process proceed to step S128 and transmits the data reception completion notification with respect to the color Y to the upper level device 10 through the control line 12.

In step S129, the printing device controller 14 determines whether the data transfer of all of the colors of Y, C, M, and K terminates. When it is determined that the data transfer does not terminate, the printing device controller 14 makes the process to return to step S124 and executes the process with respect to the next color. Meanwhile, when it is determined that the data transfer of all of the colors Y, C, M, and K ends in step S129, the printing device controller 14 sets the page number "n" to "n+1" and returns the process to step S123.

In FIG. 13, the processes of steps S124 to S128 are sequentially executed with respect to the individual colors Y, C, M, and K. However, the present invention is not limited thereto. For example, the processes of steps S124 to S128 may be executed in parallel with respect to the individual colors Y, C, M, and K. In this case, in step S129, the printing device controller 14 stands by the data reception completion notification in step S128 in the processes of the individual colors Y, C, M, and K.

The printing device controller 14 transmits a printing instruction to the data transfer control units 30a to 30d through each of the engine I/F control lines 40a to 40d. By the printing instruction, the print image data is read from the memories 31a to 31d in the data transfer control units 30a to 30d and printing of the print image data with respect to the printing paper is executed.

The printing instructions that are transmitted from the printing device controller 14 to the individual data transfer control units 30a to 30d can be generated as a table based on information needed to perform printing, which is setting information of printing conditions, among the control information described using FIG. 7. The printing device controller 14 transmits the table generated in the above-described way to each of the data transfer control units 30a to 30d.

Figure 14:
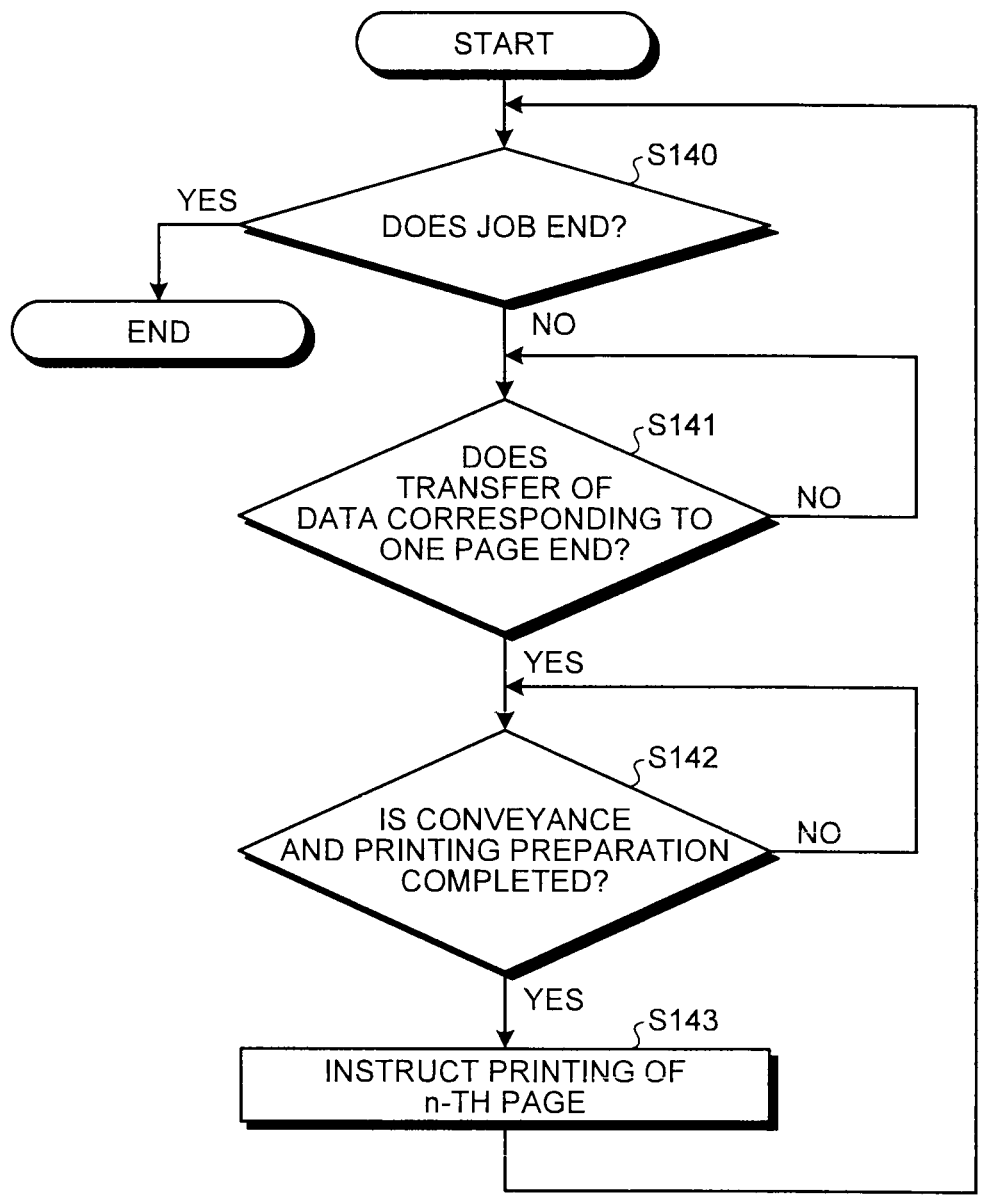
FIG. 14 is a flowchart illustrating an example of a process of a printing instruction of the printing device controller applicable to the embodiment of the present invention.

FIG. 14 is a flowchart illustrating an example of a process that is executed when the printing device controller 14 instructs printing. Before the flowchart is executed, the printing device controller 14 transmits a printing preparation instruction to the conveyance control unit 51.

In step S140, the printing device controller 14 determines whether the job end notification is transmitted from the upper level device 10. When it is determined that the job end notification is transmitted, the printing device controller 14 terminates a series of processes. When it is determined that the job end notification is not transmitted from the upper level device 10, the printing device controller 14 makes the process proceed to step S141.

In step S141, the printing device controller 14 stands by the completion of transferring the print image data corresponding to at least one page with respect to each of the colors Y, C, M, and K. When it is determined that the transfer of the print image data corresponding to one page terminates, the printing device controller 14 makes the process proceed to step S142 to stand by reception of a response indicating the printing preparation completion from the conveyance control unit 51.

Once the printing device controller 14 receives the response indicating the printing preparation completion transmitted from the conveyance control unit 51 through the conveyance control line 41, the printing device controller 14 transmits a printing instruction to instruct to perform printing of the n-th page to the data transfer control units 30a to 30d through the engine I/F control lines 40a to 40d, respectively in step S143.

Figure 15:
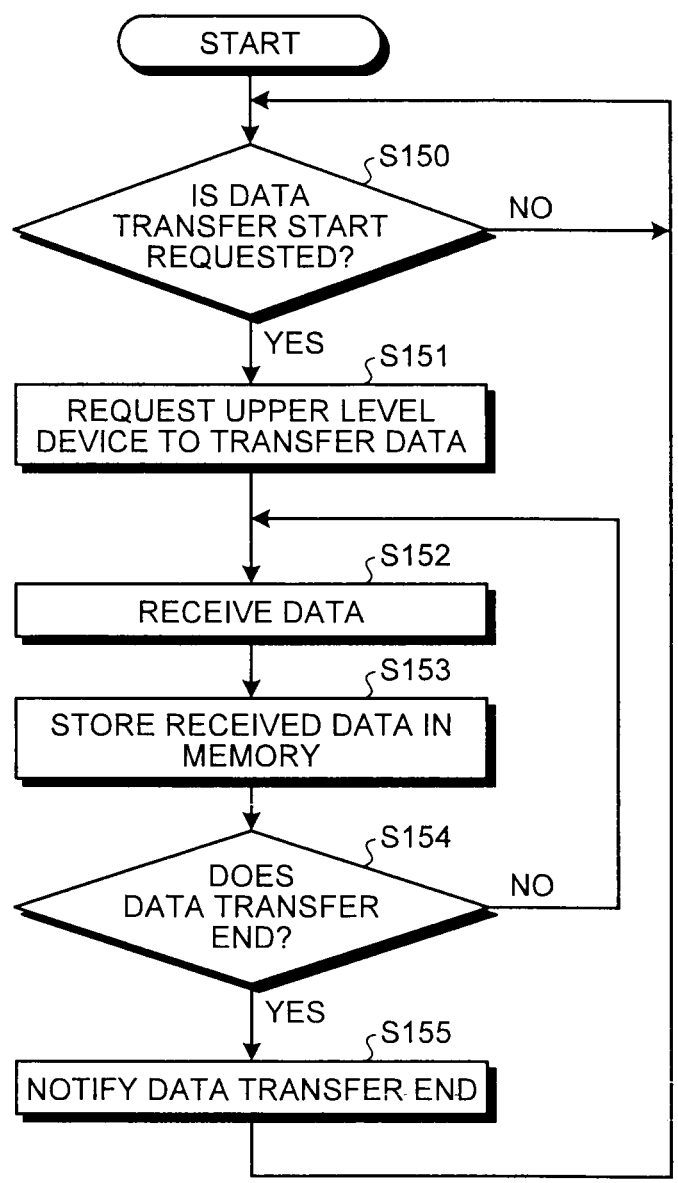
FIG. 15 is a flowchart illustrating an example of a process of each data transfer control unit applicable to the embodiment of the present invention.

FIG. 15 is a flowchart illustrating an example of a process in each of the data transfer control units 30a to 30d relating to the data transfer. In this case, in order to simplify the description, the process in the color Y and the data transfer control unit 30a will be described. In step S150, the data transfer control unit 30a stands by a data transfer start request that is transmitted from the printing device controller 14 through the engine I/F control line 40a.

Once the data transfer control unit 30a receives the data transfer start request, the data transfer control unit 30a transmits a data transfer request to request to transfer the print image data of the color Y to the upper level device 10 through the data line 11a in step S151. The print image data of the color Y that is transmitted from the upper level device 10 through the data line 11a according to the data transfer request is received by the data transfer control unit 30a (step S152). The data transfer control unit 30a controls a data transfer DMA 133a and stores the received print image data of the color Y in a predetermined area of the memory 31a (step S153).

In step S154, the data transfer control unit 30a determines whether the transfer of the print image data of the color Y from the upper level device 10 terminates. The data transfer control unit 30a can determine whether the transfer of the print image data terminates, on the basis of size information added to the transferred print image data. When it is determined that the transfer of the print image data does not terminate, the data transfer control unit 30a makes the process return to step S152 and continues to receive data and store the data in the memory 31a. Meanwhile, when it is determined that the transfer of the print image data terminates, the process proceeds to step S155. The data transfer control unit 30a transmits the data transfer completion notification to the printing device controller 14 through the engine I/F control line 40a. Then, the process returns to step S150.

Figure 16:
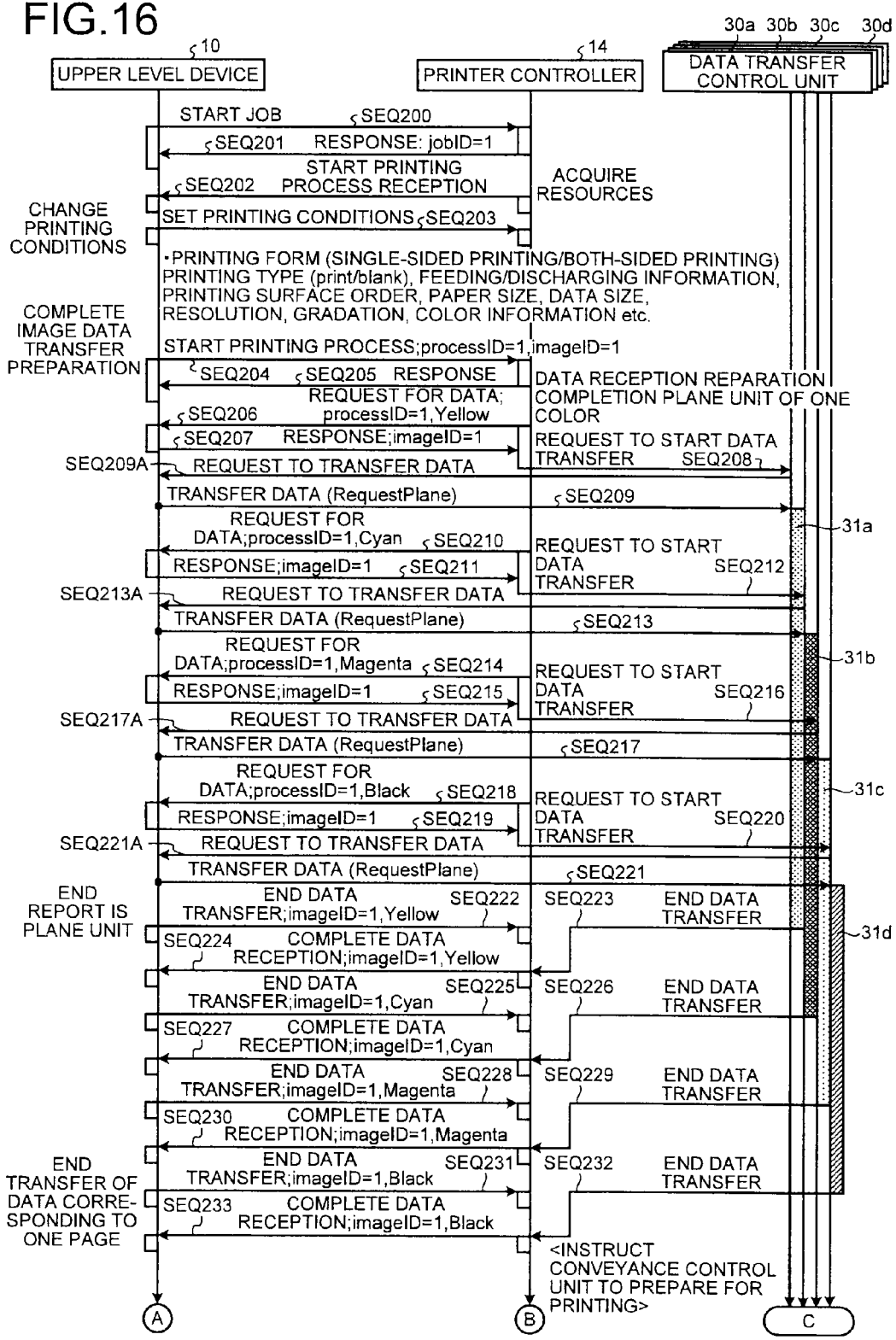
FIG. 16 is a sequence diagram specifically illustrating an example of a printing process applicable to the embodiment of the present invention.
Figure 17:
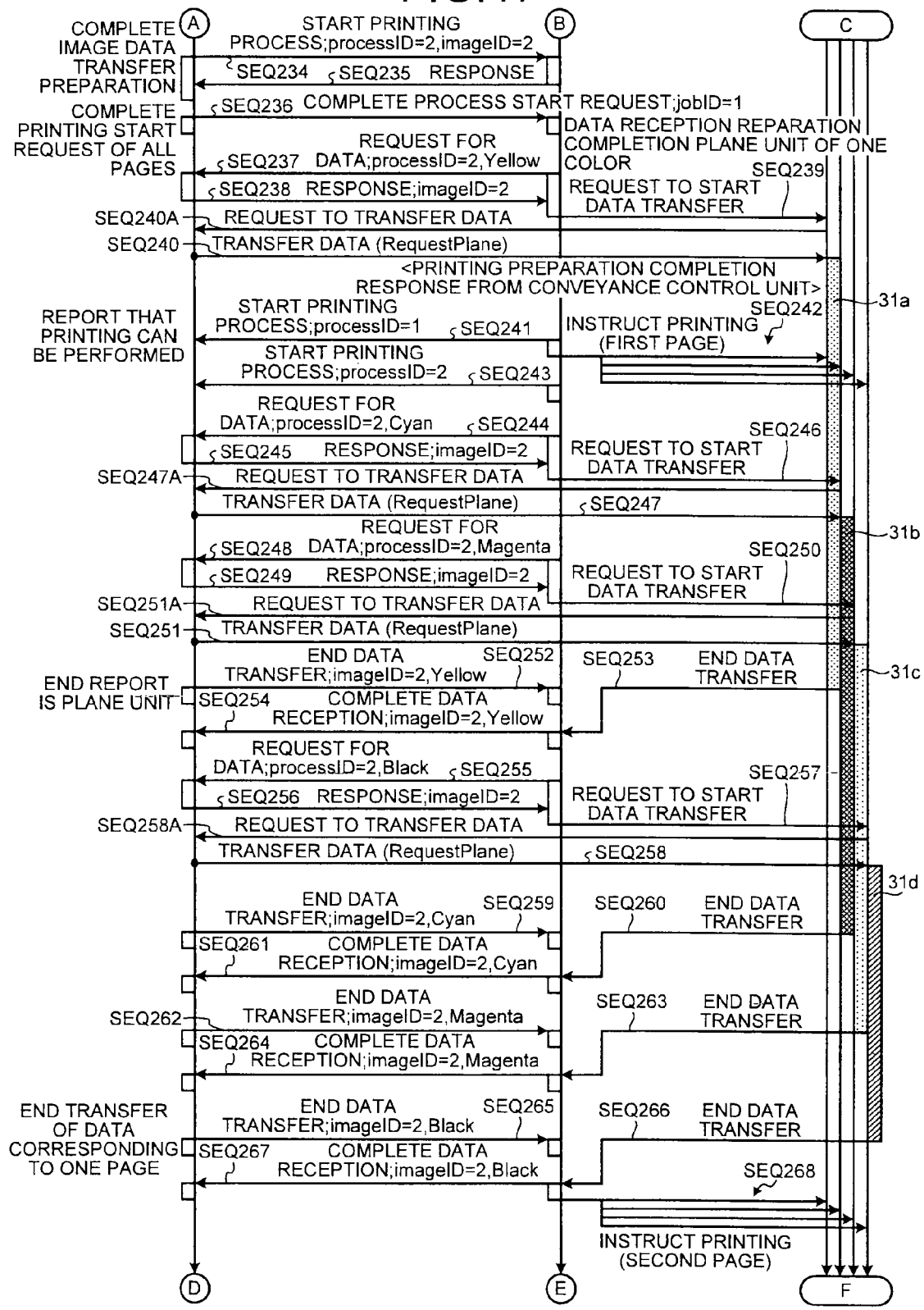
FIG. 17 is sequence diagram specifically illustrating an example of a printing process applicable to the embodiment of the present invention.
Figure 18:
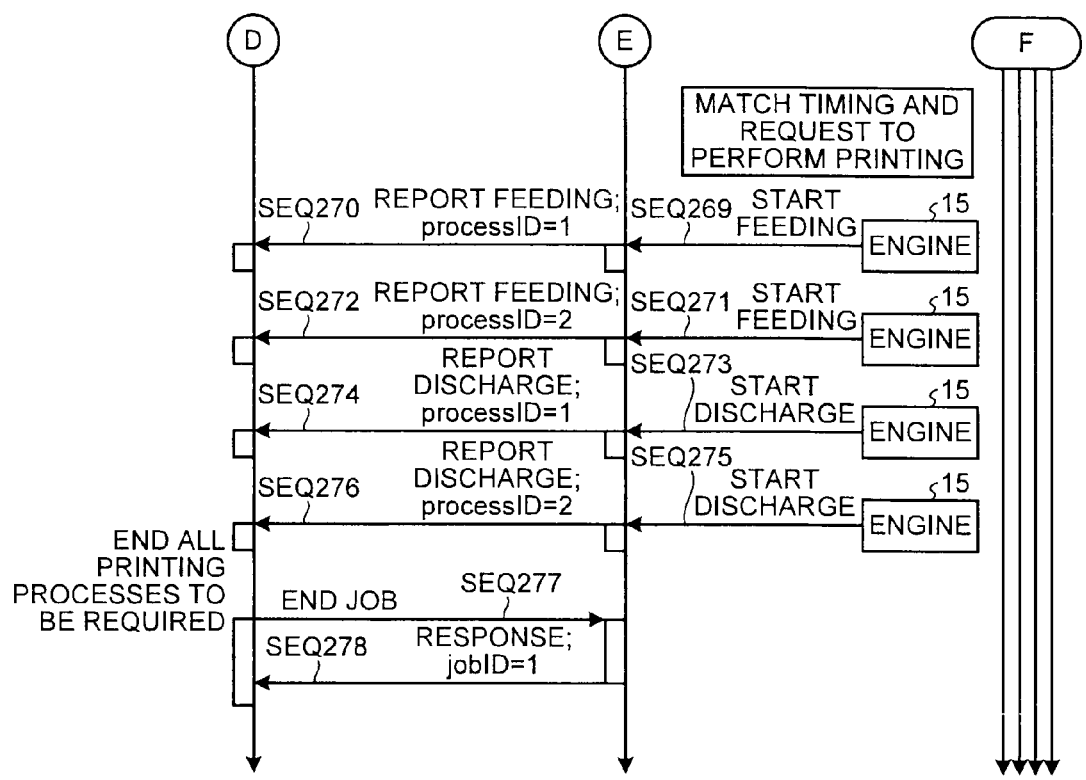
FIG. 18 is a sequence diagram specifically illustrating an example of a printing process applicable to the embodiment of the present invention.

FIGS. 16 to 18 are sequence diagrams specifically illustrating an example of a printing process that can be applied to each embodiment realized according to each flowchart illustrated in FIGS. 12 to 15. In FIGS. 16 to 18, reference numerals A to F indicate that the process proceeds to the corresponding reference numerals between the different drawings. Hereinafter, it is assumed that a print job is to perform printing corresponding to two pages.

Referring to FIG. 16, first, control information of the print job is transmitted from the upper level device 10 to the printing device controller 14 through the control line 12 (SEQ200). The printing device controller 14 transmits control information indicating the job identifier jobID=1 responding to the control information to the upper level device 10 through the control line 12 (SEQ201). The printing device controller 14 acquires resources to execute a job according to the start of the job. The printing device controller 14 transmits control information indicating a printing process reception start to the upper level device 10 through the control line 12 (SEQ202).

Next, the upper level device 10 transmits control information to determine printing conditions to the printing device controller 14 through the control line 12 (SEQ203). The printing conditions that are set to the printing device controller 14 include a printing form, a printing type, feeding/discharging information, order of printing surfaces, a size of printing paper, a data size of print image data, resolution and gradation, and color information as described with reference to FIG. 10. Further, the printing conditions may include information of the number of pages to be printed. Once the control information is received in the printing device controller 14, the various printing conditions that are included in the received control information are written in a register of the printing device controller 14, for example, and the printing conditions are set.

Next, the upper level device 10 transmits the control information of the printing process start of the first page to the printing device controller 14 through the control line 12 (SEQ204). The control information includes a process identification number processID=1 to identify the process and an image identification number imageID=1 indicating an image constituting the first page. The printing device controller 14 returns control information of the printing process start to be a response to the printing process start, to the upper level device 10 (SEQ205).

Next, the printing device controller 14 transmits control information of the printing process request to the upper level device 10 and requests the upper level device 10 to transmit the print image data. The printing process request is sequentially processed in arrangement order of the colors of the printer engine 15, with respect to the individual colors Y, C, M, and K. In this example, the heads of the colors Y, C, M, and K along a conveyance direction of the printing paper 201 are arranged in order of the heads 56a, 56b, 56c, and 56d.

First, the printing device controller 14 transmits the control information of the printing process request to request to transmit the print image data of the color Y to the upper level device 10 through the control line 12 (SEQ206). The control information includes process identification number processID=1 to designate a process and color information Yellow to designate the color Y. The upper level device 10 returns the control information including the image identification number imageID=1 to the printing device controller 14 in response to the control information (SEQ207). Once the printing device controller 14 receives the control information, the printing device controller 14 requests the data transfer control unit 30a corresponding to the color Y to start to transmit the print image data (SEQ208). At this time, the printing device controller 14 transmits a data size of the print image data requiring the start of the transmission and the request to the data transfer control unit 30a.

The data transfer control unit 30a receives the request and requests the upper level device 10 to transmit the print image data of the plane of the color Y through the data line 11a (SEQ209A), and the print image data of the color Y is transmitted from the upper level device 10 to the data transfer control unit 30a (SEQ209) according to the request. The transmitted print image data is stored in an area in the memory 31a of the data transfer control unit 30a that is allocated for the print image data of the first page.

Hereinafter, the same processes as those of SEQ206, SEQ207, SEQ208, SEQ209A, and SEQ209 are repeated with respect to each of the other colors C, M, and K, the print image data of each color is transmitted from the upper level device 10 to the data transfer control units 30b, 30c, and 30d through the data lines 11b, 11c, and 11d and are stored in the areas of the memories 31b, 31c, and 31d that are allocated for the print image data of the first page (SEQ210 to SEQ221).

Once the print image data transfer of one plane completes, the upper level device 10 transmits the control information of the data transfer completion to the printing device controller 14. The printing device controller 14 transmits the control information of the reception completion of the print image data to the upper level device 10, according to the control information.

For example, once the print image data transfer of the plane of the color Y completes, the upper level device 10 transmits the control information of the data transfer completion including the image identification number imageID=1 and the color information Yellow to the printing device controller 14 (SEQ222). Meanwhile, once the print image data transfer from the upper level device 10 through the data line 11a completes, the data transfer control unit 30a notifies the printing device controller 14 of the completion of the transfer (SEQ223). The printing device controller 14 transmits the control information of the data reception completion including the image identification number imageID=1 and the color information Yellow to the upper level device 10, in response to the notification (SEQ224).

Hereinafter, the same processes as those of SEQ222 to SEQ224 are repeated with respect to other colors C, M, and K, respectively, in accordance with the completion of transferring each print image data. And the control information of the data reception completion is transmitted to the upper level device 10 (SEQ225 to SEQ233).

After the printing device controller 14 transmits the control information of the data reception completion with respect to the final print image data (that is, print image data of the color K) of the first page to the upper level device 10 at SEQ233, the printing device controller 14 instructs the conveyance control unit 51 to prepare for printing. The conveyance control unit 51 starts to convey the printing paper 201 to the printing position, according to the instruction.

The description proceeds to FIG. 17. Once the print image data transfer of each color of the first page is completed, the upper level device 10 transmits the control information of the printing process start of the second page to the printing device controller 14 through the control line 12 (SEQ234). The control information includes the process identification number processID=2 to identify the process of the second page and the image identification number imageID=2 indicating the image constituting the second page. The printing device controller 14 returns the control information of the printing process start to be a response to the printing process start to the upper level device 10 (SEQ235).

For example, when printing of the second page is performed, the printing process start request is completed by the processes of SEQ234 and SEQ235. For this reason, once the upper level device 10 receives the response to the printing process start request of the second page at SEQ235, the upper level device 10 transmits the control information of the process start request completion where the job identifier jobID=1 is designated to the printing device controller 14, at SEQ236.

Next, similar to SEQ206 to SEQ221, the printing device controller 14 transmits the control information of the printing process request to the upper level device 10 and requests the upper level device 10 to transmit the print image data. The printing process request is sequentially processed according to arrangement order of the colors in the printer engine 15, with respect to each of the colors Y, C, M, and K.

First, the printing device controller 14 transmits the control information of the printing process request to request to transmit the print image data of the color Y to the upper level device 10 through the control line 12 (SEQ237). The control information includes the process identification number processID=2 to designate the process and the color information Yellow to designate the color Y. The upper level device 10 returns the control information including the image identification number imageID=2 to the printing device controller 14, in response to the control information (SEQ238). Once the printing device controller 14 receives the control information, the printing device controller 14 requests the data transfer control unit 30a corresponding to the color Y to start to transmit the print image data (SEQ239).

The data transfer control unit 30a receives the request and requests the upper level device 10 to transmit the print image data of the plane of the color Y through the data line 11a (SEQ240A), and the print image data of the color Y is transmitted from the upper level device 10 to the data transfer control unit 30a according to the request (SEQ240). The transmitted print image data is stored in an area in the memory 31a of the data transfer control unit 30a that is allocated for the print image data of the second page.

Hereinafter, the same processes as those of SEQ237, SEQ238, SEQ239, SEQ240A, and SEQ240 are repeated with respect to each of the other colors C, M, and K, the print image data of each color is transmitted from the upper level device 10 to the data transfer control units 30b, 30c, and 30d through the data lines 11b, 11c, and 11d and are stored in the areas of the memories 31b, 31c, and 31d that are allocated for the print image data of the second page (SEQ244 to SEQ251 and SEQ255 to SEQ258).

Similar to the above case, the upper level device 10 transmits the control information of the data transfer completion to the printing device controller 14, whenever the transmission of the print image data of one plane ends. The printing device controller 14 transmits the control information of the reception completion of the print image data to the upper level device 10, in response to the control information.

In the example of FIG. 17, once the print image data transfer of the color Y at SEQ240 completes, the upper level device 10 transmits the control information of the data transfer completion to the printing device controller 14 (SEQ252). Once the print image data transfer from the upper level device 10 through the data line 11a completes, the data transfer control unit 30a transmits the notification indicating the completion of the transfer to the printing device controller 14 (SEQ253). The printing device controller 14 transmits the control information of the data reception completion including the image identification number imageID=2 and the color information Yellow to the upper level device 10, in response to the notification (SEQ254).

Hereinafter, the same processes as those of SEQ252 to SEQ254 are repeated with respect to each of the other colors C, M, and K according to the completion of transferring each print image data, and the control information of the data reception completion is transmitted to the upper level device 10 (SEQ259 to SEQ267).

In the example of FIG. 17, the response indicating that the printing preparation from the conveyance control unit 51 is completed according to the instruction of the printing preparation with respect to the conveyance control unit 51 immediately before SEQ234 described above is notified from the conveyance control unit 51 to the printing device controller 14 immediately after SEQ240. Once the printing device controller 14 receives the notification, the printing device controller 14 transmits the two items of control information of the printing process start of the process identification number processID=1 and the process identification number processID=2 to the upper level device 10 (SEQ241 and SEQ243). Thereby, the notification indicating that it is ready to perform the printing of the first page and the second page is transmitted to the upper level device 10.

At the time point of SEQ241, the transfers of each color print image data of the first page with respect to the data transfer control units 30a, 30b, 30c, and 30d are completed.

For this reason, the printing device controller 14 notifies each of the data transfer control units 30a, 30b, 30c, and 30d of a printing instruction to perform printing of the first page (SEQ242). The printing instructions are stored in the memories 31a, 31b, 31c, and 31d in the data transfer control units 30a, 30b, 30c, and 30d. The actual print operation according to the printing instruction is executed by matching timing with timing of a print operation of a page to be executed hereinafter.

In the example of FIG. 17, in the printing device controller 14, the request with respect to the upper level device 10 of the print image data of the plane of the color C where transfer secondly starts is delayed due to transmission of the control information of the printing process start of SEQ241 and SEQ243 (refer to SEQ244). Due to the delay, the transfer of the print image data of the plane of the color Y where the transfer first starts may be completed before the transfer of the print image data of the plane of the color K starts (refer to SEQ253). After the notification process of the transfer completion of the print image data of the plane of the color Y (SEQ253), the transfer of the print image data of the plane of the color K starts (SEQ257 and SEQ258).

During the data transfer process of the first page illustrated in FIG. 16, after the transfer of the print image data of each color is performed in order of the colors and the transfer of the print image data ends, the data transfer end process is executed in order of the colors. Meanwhile, during the data transfer process of the second page that is illustrated in FIG. 17, the data transfer end process may start before the transmission of the print image data of each color ends.

As described above, the data transfer control units 30a, 30b, 30c, and 30d to control the transmission of the data of the colors Y, C, M, and K are independently configured and the printing device controller 14 can independently communicate with the data transfer control units 30a, 30b, 30c, and 30d. The data transfer control units 30a, 30b, 30c, and 30d independently execute the process. For this reason, the process does not need to be changed, even though another process is interrupted during a series of processes executed by the data transfer control units 30a, 30b, 30c, and 30d.

At SEQ267, once the printing device controller 14 notifies the upper level device 10 of completion of transmission of the print image data of the plane of the color K, the printing device controller 14 notifies each of the data transfer control units 30a, 30b, 30c, and 30d of a printing instruction to instruct to perform printing of the second page (SEQ268).

The description proceeds to FIG. 18. In the printer engine 15, printing of the first page is executed according to a printing instruction of SEQ242 and feeding of the printing paper 201 starts. The printer engine 15 notifies the printing device controller 14 of the feeding start of the first page (SEQ269). Once the printing device controller 14 receives the notification, the printing device controller 14 transmits control information indicating that the process identification number processID is set to 1 and feeding of the first page starts, to the upper level device 10 (SEQ270). In addition, the printing device controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the first page with respect to the printing paper 201.

Similarly, once printing of the first page is completed and printing of the second page starts, the printer engine 15 notifies the printing device controller 14 of the feeding start of the second page (SEQ271). Once the printing device controller 14 receives the notification, the printing device controller 14 transmits control information indicating that the process identification number processID is set to 2 and feeding of the second page starts, to the upper level device 10 (SEQ272). In addition, the printing device controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the second page with respect to the printing paper 201.

Once printing of each color of the first page ends and the first page of the printing paper 201 is discharged, the printer engine 15 notifies the printing device controller 14 of the end of the printing and the discharge of the first page (SEQ273). Once the printing device controller 14 receives the notification, the printing device controller 14 transmits control information indicating that the process identification number processID is set to 1 and the printing paper 201 of the first page is discharged, to the upper level device 10 (SEQ274). Similar to the above case, once printing of each color of the second page ends and the second page of the printing paper 201 is discharged, the printer engine 15 notifies the printing device controller 14 of the end of the printing and the discharge of the second page (SEQ275). The printing device controller 14 transmits control information indicating that the process identification number processID is set to 2 and the printing paper 201 of the second page is discharged, to the upper level device 10, in response to the notification (SEQ276).

Once the upper level device 10 receives a discharge report corresponding to information indicating the number of pages to be printed included in the control information of setting of the printing conditions from the printing device controller 14 at SEQ203, the upper level device 10 determines that the printing based on the job where the start is notified at SEQ200 ends, and transmits control information of the end of the job of the job identification number jobID=1 to the printing device controller 14 (SEQ277). Once the printing device controller 14 receives the control information, the printing device controller 14 sets the job identification number jobID=1 and transmits control information of the response to the upper level device 10 (SEQ278). Accordingly, a series of printing processes ends.

As described above, the functions conventionally executed by each color data transfer control unit, such as the control of the transmission timing of the print image data from the upper level device 10 or the exchange of the control information with the upper level device 10, are collectively performed by the printing device controller 14. The data transfer control units (data transfer control units 30a to 30d) that correspond to the individual colors only receive and read the print image data. For this reason, the transmission process of the print image data can be executed at a high speed.

The data transfer control units 30a, 30b, 30c, and 30d that control the transmission of the data of the individual colors Y, C, M, and K are independently configured. In addition, the printing device controller 14 and the data transfer control units 30a, 30b, 30c, and 30d are connected by the engine I/F control lines 40a, 40b, 40c, and 40d, and communication between the printing device controller 14 and the data transfer control units 30a, 30b, 30c, and 30d is independently performed by the data transfer control units 30a, 30b, 30c, and 30d. The data transfer control units 30a, 30b, 30c, and 30d independently execute the processes.

For this reason, the process does not need to be changed, even though another process is interrupted during a series of processes executed by the data transfer control units 30a, 30b, 30c, and 30d, from SEQ237 to SEQ266. Since the processes of the data transfer control units 30a, 30b, 30c, and 30d are independently executed, addition or removal of the data transfer control units 30a, 30b, 30c, and 30d can be easily performed and various variations of the system configuration can be provided with the common configuration.

<Another Example of Data Transfer Process>

Next, another example of the data transfer process will be described. In the above example, when the transfer process of the print image data of each color is executed, the upper level device 10 transfers the print image data of each color according to the data transfer request transmitted from the data transfer control units 30a to 30d of the individual colors through the data lines 11a to 11d. Meanwhile, in this example, the data transfer request is not transmitted from the data transfer control units 30a to 30d to the upper level device 10. After responding to the data request from the printing device controller 14, the upper level device 10 directly transmits the print image data of each color to the data transfer control units 30a to 30d through the data lines 11a to 11d.

Figure 19:
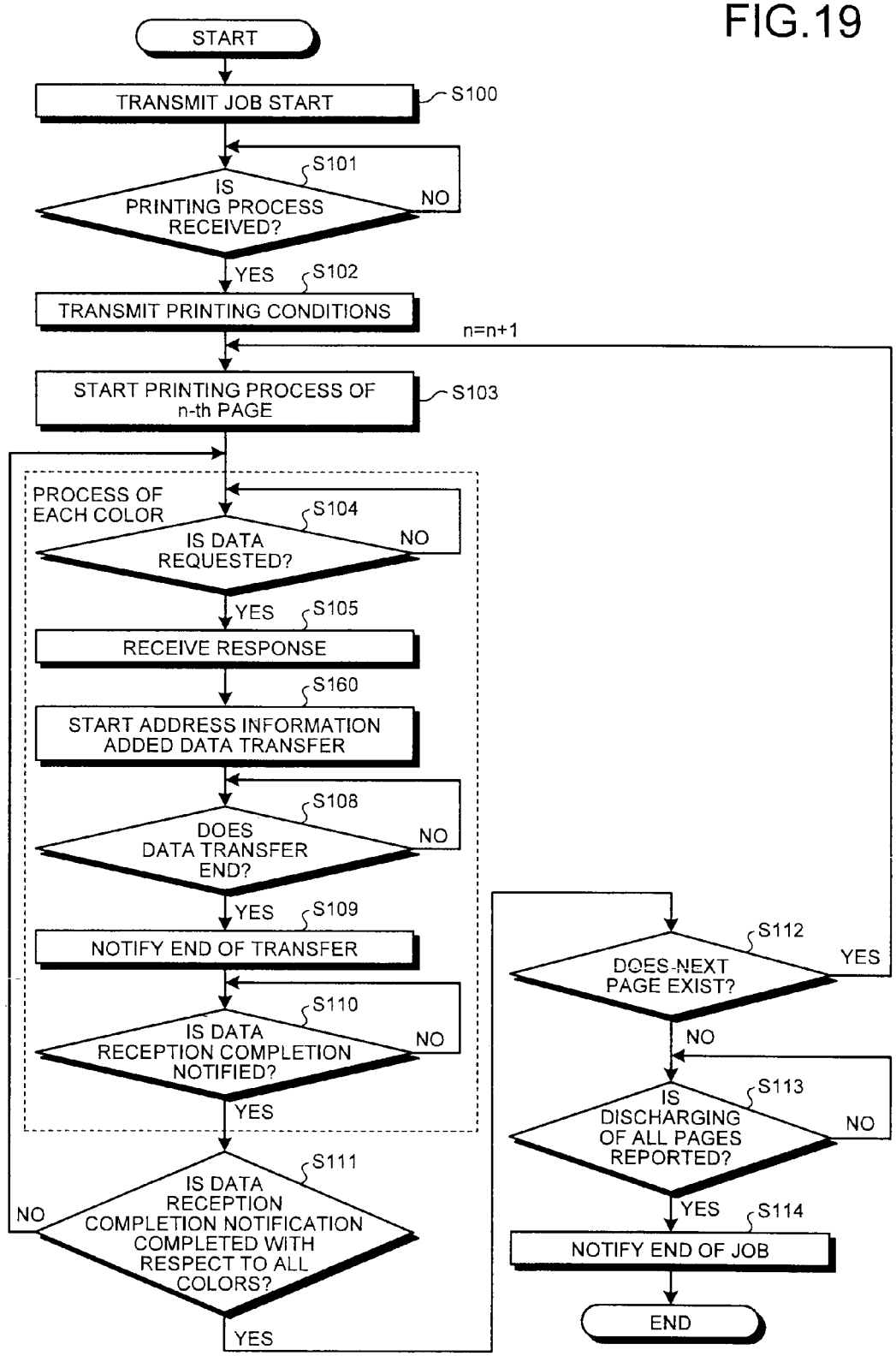
FIG. 19 is a flowchart illustrating another example of a process of the upper level device applicable to the embodiment.

The data transfer process of the print image data according to another example of the data transfer process will be described using flowcharts of FIGS. 19 and 20. FIG. 19 is a flowchart illustrating an example of a process in the upper level device 10 according to the data transfer of this example. In FIG. 19, the processes that are common to those of FIG. 12 described above are denoted by the same reference numerals and the redundant description will not be repeated.

As illustrated in the flowchart of FIG. 11A, the process of the upper level device 10 is the same as the process illustrated in FIG. 9A in the process until the response with respect to the data request from the printing device controller 14 of step S105 is returned to the printing device controller 14 from the transmission of the control information indicating the job start of step S100. Therefore, the redundant description will not be repeated.

In this example, after transmitting the response to the data request from the printing device controller 14 to the printing device controller 14 through the control line 12 in step S105, the upper level device 10 makes the process proceed to step S160. In step S160, the upper level device 10 transmits the print image data of the color Y to the data transfer control unit 30a through the data line 11a and stores the print image data in the memory 31a in the data transfer control unit 30a. At this time, the upper level device 10 adds the address information of the memory 31a to the transmitted print image data and transmits the print image data to the data transfer control unit 30a. The data transfer control unit 30a stores the print image data in the memory 31a, according to the address information added to the print image data.

The upper level device 10 executes the transmission process of the print image data of step S160 by the predetermined amount, for example, until the transmission of the print image data corresponding to one page ends. When it is determined that the transmission of the print image data ends in step S108, the upper level device 10 transmits the data transfer end notification to the printing device controller 14 through the control line 12 in step S109, and stands by a response to the notification, from the printing device controller 14, in step S110. Since the following processes are the same as those illustrated in FIG. 12, the redundant description will not be repeated.

In this example, since the data transfer process and the printing instruction process in the printing device controller 14 are the same as the processes descried using FIGS. 13 and 14, the redundant description will not be repeated.

Figure 20:
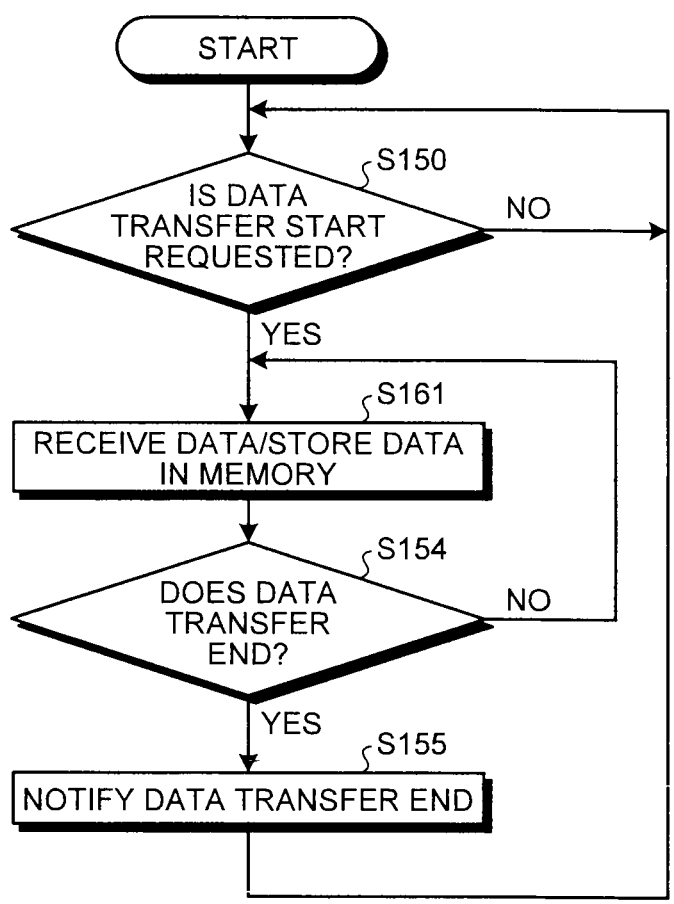
FIG. 20 is a flowchart illustrating another example of a process of a data transfer control unit applicable to the embodiment of the present invention.

FIG. 20 is a flowchart illustrating another example of a process in the data transfer control unit 30a that is related to the data transfer. In FIG. 20, components that are common to those of FIG. 15 are denoted by the same reference numerals and the redundant description will not be repeated.

In step S150, the data transfer control unit 30a stands by a data transfer start request transmitted from the printing device controller 14 through the engine I/F control line 40a. Once the data transfer control unit 30a receives the data transfer start request from the printing device controller 14, the data transfer control unit 30a makes the process proceed to step S161 and receives the print image data of the color Y transmitted from the upper level device 10 through the data line 11a. The data transfer control unit 30a stores the print image data in the memory 31a, according to the address information added to the print image data.

In step S154, the data transfer control unit 30a determines whether transmission of the print image data of the color Y from the upper level device 10 ends. For example, the data transfer control unit 30a determines whether the transmission of the print image data ends, on the basis of the size information added to the print image data transmitted by the upper level device 10. The upper level device 10 may transmit instruction information to the data transfer control unit 30a, when the transmission of the print image data ends. When it is determined that the transmission of the print image data does not end, the upper level device 10 makes the process return to step S161 and continuously receives the data and stores the data in the memory 31a.

Meanwhile, when it is determined that the transmission of the print image data ends, the upper level device 10 makes the process proceed to step S155 and transmits the data end notification to the printing device controller 14 through the engine I/F control line 40a. Then, the process is returned to step S150.

As such, without transmitting the data transfer request from the data transfer control units 30a to 30d to the upper level device 10, after responding to the data request from the printing device controller 14, the upper level device 10 may directly transfer the print image data of the individual colors to the data transfer control units 30a to 30d through the data lines 11a to 11d.

Hereinafter, specific configuration of the present embodiment will be described. In the present embodiment, when a trouble occurs, the type of the trouble is judged. When it is judged that the trouble is a type that cannot assure a successful printing result, printing is immediately stopped regardless of perforations. When it is judged that the trouble is a type that can assure a successful printing result, conveyance of paper is continued until printing of all the spooling pages is completed.

For example, when a control signal transmitting/receiving unit 21 of the printing device controller 14 receives trouble information from the data transfer control units 30a, 30b, 30c, and 30d, a control unit 23 of the printing device controller 14 judges whether the occurred trouble is a specific trouble that is preliminarily determined to be able to assure a successful printing result if printing is continued after the occurrence of the trouble, with reference to a trouble table.

The trouble table is stored in a storage unit such as a read only memory (ROM) 324 or a random access memory (RAM) 323 of the printing device controller 14, and has information regarding troubles. In the trouble table, trouble identification information for identifying the occurred troubles is associated with contents of the troubles and the types of the troubles, a specific trouble or a general trouble other than the specific troubles.

Here, the specific troubles include paper size error that a paper size of printing image data is not identical to the size of printing paper, jam at a discharging portion, and the like. These errors assure the successful printing result for a range by perforations. Further, the general troubles other than specific troubles include jam at a feeding portion and the like.

FIG. 21 is a diagram illustrating an example of the trouble table. As illustrated in FIG. 21, in the trouble table, the trouble identification information is associated with the contents of the troubles and the types of the troubles, and the trouble identification information along with the contents of the troubles and the types of the troubles are recorded. In addition, FIG. 21 illustrates an example of the paper size error and the jam at the discharging portion as the specific troubles, and the jam at the feeding portion as the general troubles.

In addition, as long as the trouble table can determine whether the troubles are the specific troubles or the general troubles, the trouble table is not limited to the example illustrated in FIG. 21. For example, the trouble table may be configured to record the specific troubles only. In this case, since troubles recorded in the trouble table are the specific troubles, the types of the troubles need not to be recorded.

Further, FIG. 21 illustrates an example of the specific troubles and the general troubles, and the specific troubles and the general troubles are not limited to the examples.

Figure 22:
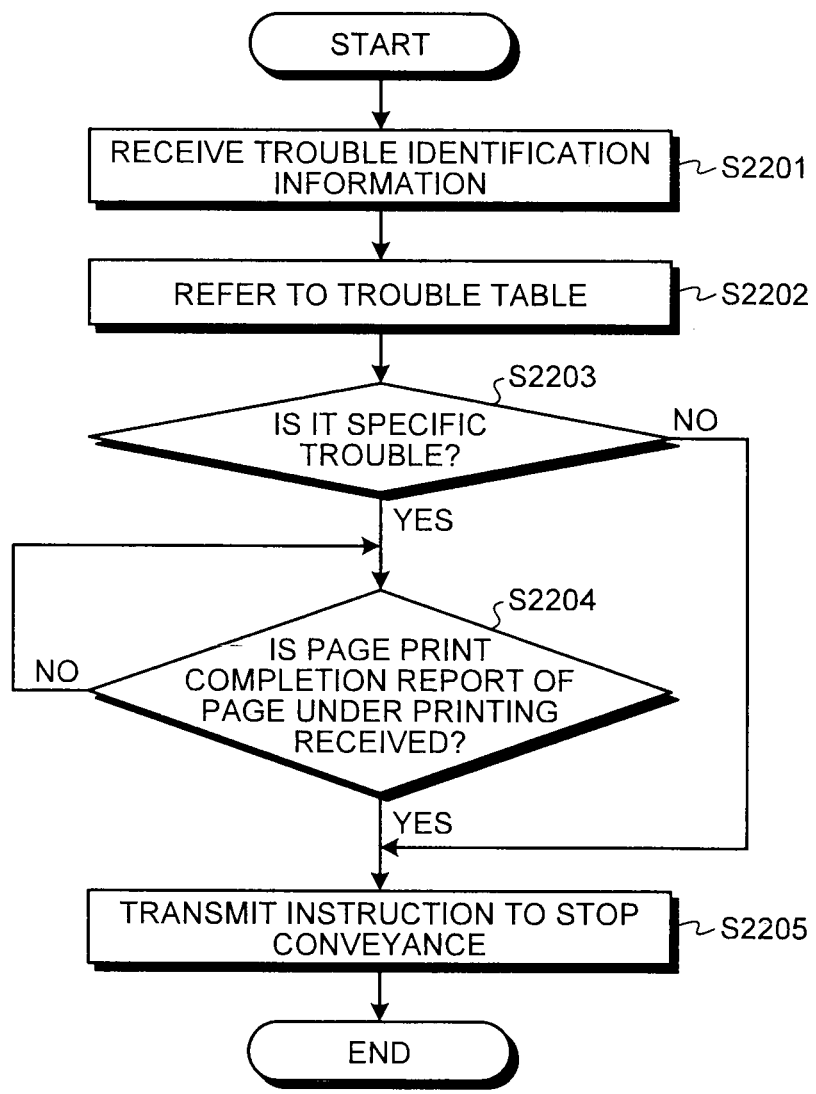
FIG. 22 is a flowchart illustrating an order of processes of a print controller when a trouble occurs.

Next, a printing process of the case where a trouble occurred, according to an embodiment, will be described. FIG. 22 is a flowchart illustrating a process sequence of a printer controller 14 when a trouble occurs. When a trouble occurs, the processes of the printing device controller 14 are suspended and processes illustrated in FIG. 22 are performed instead.

First, in step S2201, the control signal transmitting/receiving unit 21 of the printing device controller 14 receives trouble identification information of a trouble generated from data transfer control units 30 or the like. Then, the control unit 23 of the printing device controller 14 makes reference to the trouble table recorded in the ROM 324 or RAM 323 in step S2202, and determines whether or not the trouble identification information received from the control signal transmitting/receiving unit 21 corresponds to one of the specific troubles based on the trouble table in step S2203.

In addition, when the trouble that occurred is one of the specific troubles (Yes in step S2203), the control unit 23 determines whether or not on-going printing of a page by one of heads 56a to 56d corresponding to any of the data transfer control units 30a to 30d is completed in step S2204. The determination is made based on whether or not the control signal transmitting/receiving unit 21 received a notification (SEQ120a to SEQ120d or SEQ122a to SEQ122d in FIG. 11B) representing an end of the printing of page #n from any of the data transfer control units 30a to 30d.

The term "under printing" or "on-going printing" (spooling) pages refer to a page in which printing of some colors of printing image data thereof are started but printing of all colors of printing image data are not completed.

In addition, after the printing of the on-going printing page is completed (Yes in step S2204), the paper conveyance control unit 22 of the printing device controller 14 instructs the conveyance control unit 51 to stop conveyance of printing paper in step S2206.

In step S2203, the trouble that occurred is not one of the specific troubles (No in Step S2203), the paper conveyance control unit 22 instructs the conveyance control unit 51 to stop conveying the printing paper 201 before printing of the on-going printing page is not completed in step S2206.

Figure 23:
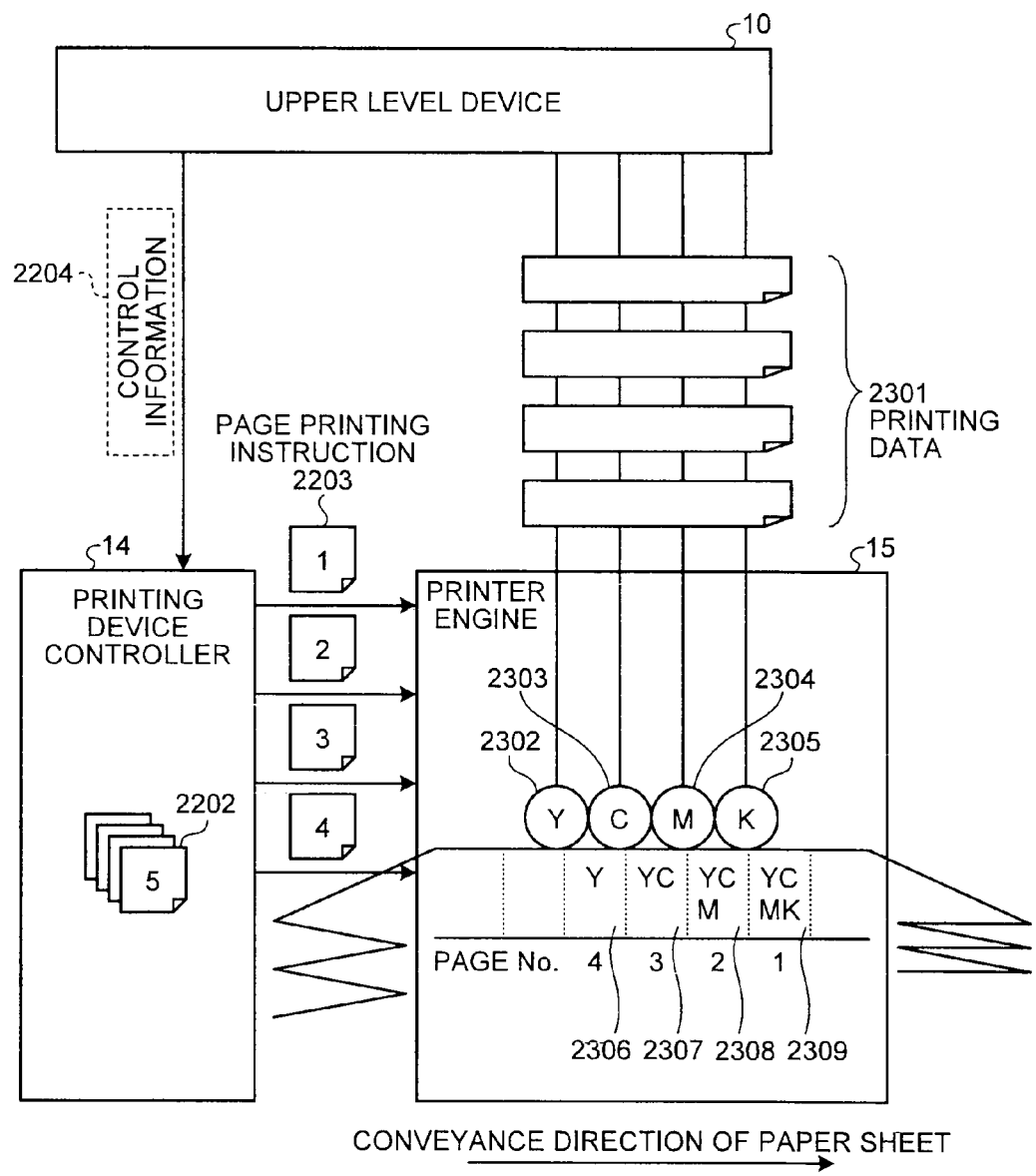
FIG. 23 is a diagram illustrating an example of a printing process when a trouble capable of assuring a successful printing result occurs.
Figure 24:
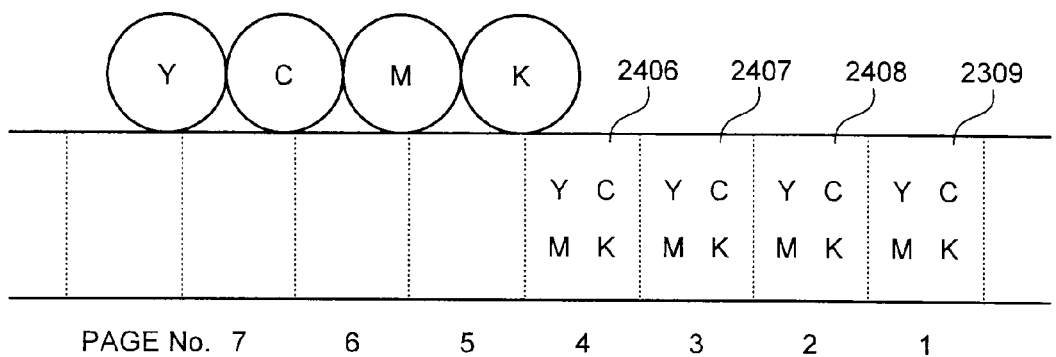
FIG. 24 is a diagram illustrating an example of a printing process when a trouble capable of assuring a successful printing result occurs.

FIGS. 23 and 24 are diagrams illustrating an example of a printing process when printing data for 4 pages is received from the upper level device 10, toner attachment for the first page is completed, and a trouble that can assure a successful printing result occurred during toner attachment for the second page.

The upper level device 10 transmits control information 2204 for controlling printing of the printing data for 4 pages to the printing device controller 14. The control signal transmitting/receiving unit 21 of printing device controller 14 transmits a page printing instruction 2203 (an instruction to print page #n in FIGS. 11A and 11B) to the data transfer control units 30a to 30d of the printer engine 15 for the first to fourth page. In FIG. 23, the data transfer control units 30a to 30d are denoted by Y302, C303, M304, and K305, respectively. The printing device controller 14 retains the fifth page of the page 2202 for which the page printing instruction has not given yet. The data transfer control units 30a to 30d that received the page printing instruction 2203 further receives printing data 2301 from the upper level device 10, and performs printing of the printing data 2301.

As illustrated in FIG. 23, all toners, Y, C, M, and K toners are completely attached for the first page 2309. But, for the second page 2308, only the Y, C, and M toners are attached. For the third page 2307, only the Y and C toners are attached. For the fourth page 2306, only the Y toner is attached. If a trouble that stops printing occurs in this state, paper is conveyed until all colors of toners are attached for the fourth page 2306 that is in spooling. This results in the second page 2308 for which all colors of toners are attached as denoted by page 2408 in FIG. 24. In the same manner, for each of the third page 2307 and the fourth page 2306, all colors of toners are attached as denoted by page 2407 and page 2406 in FIG. 24, respectively.

Accordingly, when a specific trouble that can assure a successful printing result occurs, paper continues to be conveyed to all of the data transfer control units 30a to 30d instructed to print by the printing device controller 14 until the toner attachment is completed, and the paper conveyance is stopped after the completion of the toner attachment. Accordingly, the printing device controller 14 needs not manage the toner attachment status to cancel printing. That is, the improper printings such as redundant printing may be suppressed even in a system in which the paper conveyance control and the printing data management are separated as in the system in which the printing data 2301 is directly transmitted from the upper level device 10 to the data transfer control units 30a to 30d which enables high speed data transmission.

Figure 25:
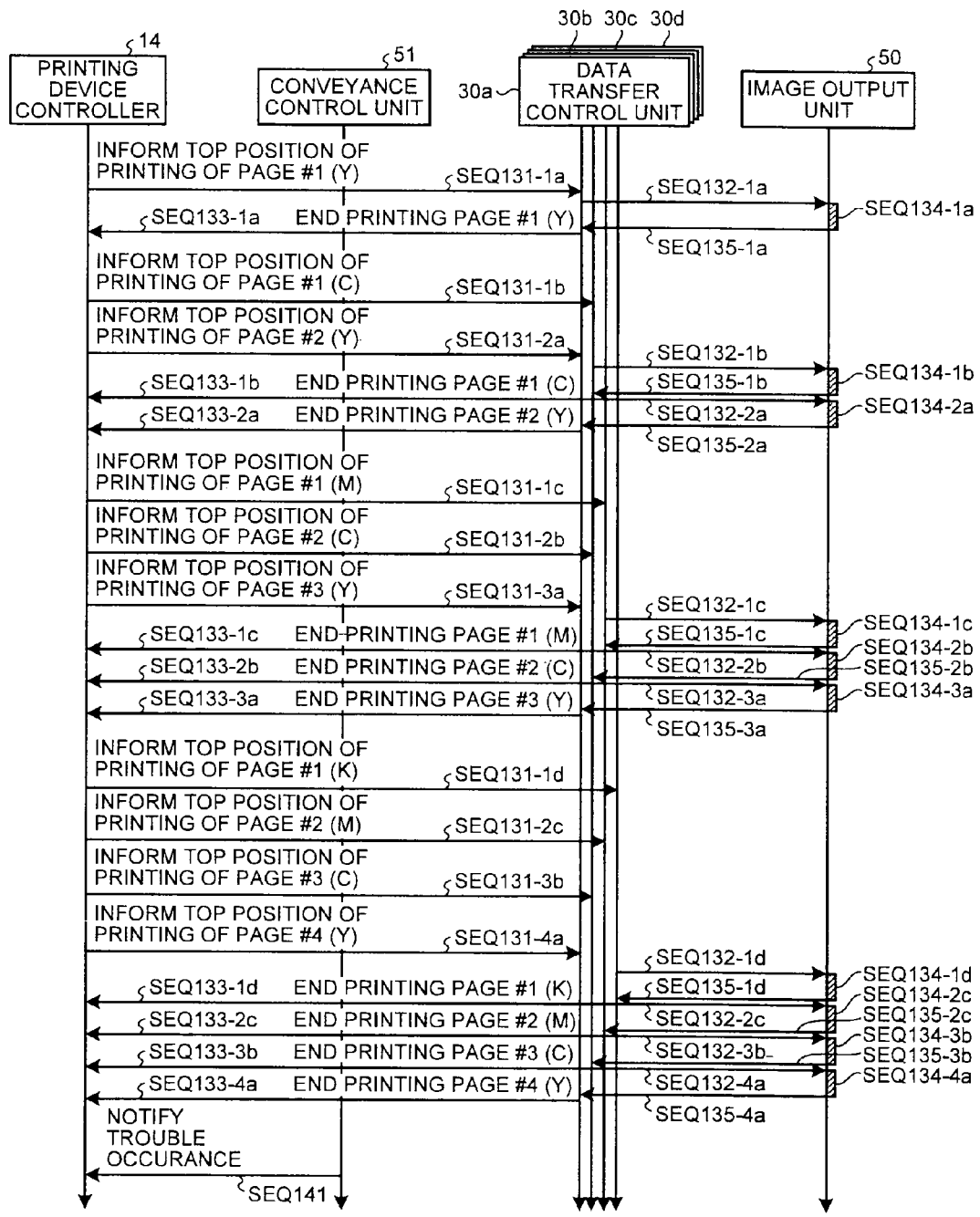
FIG. 25 is a sequence diagram conceptually illustrating an example of printing process when an trouble occurs according to the embodiment.
Figure 26:
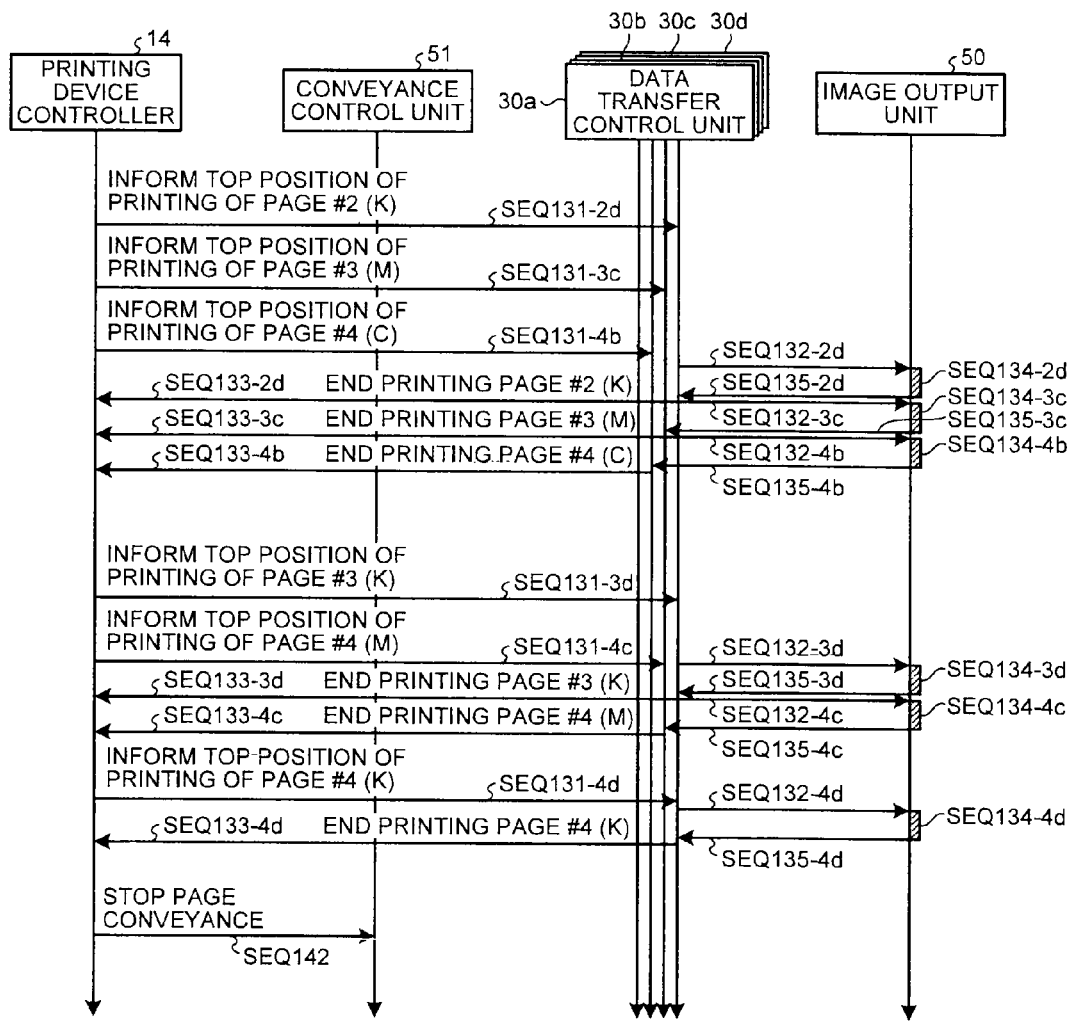
FIG. 26 is a sequence diagram conceptually illustrating a printing process when a trouble occurs according to the embodiment.

FIGS. 25 and 26 are sequence diagrams conceptually illustrating an example of a printing process when a trouble occurs according to the present embodiment. Herein, as illustrated in FIGS. 23 and 24, FIGS. 25 and 26 illustrates an example in which a specific trouble that can assure a successful printing result occurs while toner is attached for the second page out of 4 pages. For convenience of description, FIGS. 25 and 26 do not illustrate the processes other than the process corresponding to the printing head instruction (SEQ118 or the like), the process corresponding to printing (SEQ119 or the like), and the process corresponding to the ending of page printing (SEQ120 or the like) among the steps in FIG. 11.

First, for example, as illustrated in SEQ117 of FIG. 11, when there is issued a notification representing a print enabled state, the control signal transmitting/receiving unit 21 issues an instruction of informing the data transfer control unit 30*a* of the top position of the printing image data of the color Y for the first page (SEQ131-1*a*). Thereby, printing is started according to the printing head instruction. That is, the data transfer control unit 30*a* starts to read the printing image data of the color Y for the first page from the memory 31*a* and transmits the printing image data that is read to the output control unit 55 of the image output unit 50 (SEQ132-1*a*). In addition, the printing image data is supplied from the output control unit 55 to the head 56*a*, and printed by the head 56*a* on printing paper (SEQ134-1*a*). When the printing of the color Y for the first page is completed, the completion of the printing of the color Y for the first page is notified to the data transfer control unit 30*a* by the output control unit 55 of the image output unit 50 (SEQ135-1*a*), and the data transfer control unit 30*a* notifies the control signal transmitting/receiving unit 21 of the printing device controller 14 of the completion of the printing of page #1 (SEQ133-1*a*).

In the meantime, conveyance of the printing paper continues. When the printing paper corresponding to one page is conveyed, and the print enabled state is notified from the conveyance control unit 51, the control signal transmitting/receiving unit 21 issues an instruction of informing the data transfer control unit 30*b* of the top position of the printing image data of the color C for the first page (SEQ131-1*b*). In addition, the control signal transmitting/receiving unit 21 issues an instruction of informing the data transfer control unit 30*a* of the top position of the printing image data of the color Y for the second page (SEQ131-2*a*). The data transfer control units 30*b* and 30*a* start to read the printing image data of the color C for the first page and the printing image data of the color Y for the second page from the memories 31*b* and 31*a* according to the printing head instruction, respectively, and transmit the printing image data that is read to the output control unit 55 of the image output unit 50 (SEQ132-1*b* and SEQ132-2*a*). Then, each pieces of the printing image data is printed by each of the heads 56*b* and 56*a* (SEQ134-1*b* and SEQ134-2*a*). When the printing is completed, the completion of the printing is notified to the data transfer control units 30*b* and 30*a* (SEQ135-1*b* and SEQ135-2*a*). Then, the completion of the printing is also notified from the data transfer control units 30*b* and 30*a* to the control signal transmitting/receiving unit 21 of the printing device controller 14 (SEQ133-1*b* and SEQ133-2*a*).

Subsequently, in the same manner as above, printing of the color M for the first page, printing of the color C for the second page, and printing of the color Y for the third page are performed (SEQ131-1*c*, SEQ131-2*b*, SEQ131-3*a*, SEQ132-1*c*, SEQ132-2*b*, SEQ132-3*a*, SEQ134-1*c*, SEQ134-2*b*, SEQ134-3*a*, SEQ135-1*c*, SEQ135-2*b*, SEQ135-3*a*, SEQ133-1*c*, SEQ133-2*b*, and SEQ133-3*a*).

Further, printing of the color K for the first page, printing of the color M for the second page, printing of the color C for the third page, and printing of the color Y for the fourth page are performed in the same manner (SEQ131-1*d*, SEQ131-2*c*, SEQ131-3*b*, SEQ131-4*a*, SEQ132-1*d*, SEQ132-2*c*, SEQ132-3*b*, SEQ132-4*a*, SEQ134-1*d*, SEQ134-2*c*, SEQ134-3*b*, SEQ134-4*a*, SEQ135-1*d*, SEQ135-2*c*, SEQ135-3*b*, SEQ135-4*a*, SEQ133-1*d*, SEQ133-2*c*, SEQ133-3*b*, and SEQ133-4*a*).

According to the printing processing up to this point, all colors Y, C, M, and K for the first page are completely printed. However, only some colors of the four colors for the second page to the fourth page are printed, and still printing of remaining colors of the four colors for the second page to the fourth page are pending.

Herein, it is assumed that a trouble occurrence is notified from the conveyance control unit 51 (SEQ141). In addition, the notification of the trouble information is not limited to the notification from the conveyance control unit 51, but may be notifications from other devices or other constituent units, such as the upper level device 10. The control unit 23 of the printing device controller 14 makes reference to the trouble table, as described above, and determines whether or not the trouble that occurred is one of the specific troubles that can assure a successful printing result. In this example, it is described that the trouble is one of the specific troubles.

In this case, the control unit 23 and the paper conveyance control unit 22 do not perform a cancellation operation in which printing is immediately stopped. Since the control unit 23 is aware of the pages for which the page printing instruction 2203 is notified, the control unit 23 continues to instruct to print the corresponding pages. Then, the printing process ends after the completion of the printing of the corresponding pages is notified from the data transfer control units 30*a* to 30*d*.

For example, right after the occurrence of the trouble, printing of the color K for the second page, of the color M for the third page, and the color C for the fourth page is performed (SEQ131-2*d*, SEQ131-3*c*, SEQ131-4*b*, SEQ132-2*d*, SEQ132-3*c*, SEQ132-4*b*, SEQ134-2*d*, SEQ134-3*c*, SEQ134-4*b*, SEQ135-2*d*, SEQ135-3*c*, SEQ135-4*b*, SEQ133-2*d*, SEQ133-3*c*, and SEQ133-4*b*). In this way, after the occurrence of the trouble, the instruction to print the first color, the color Y, for a new page (for example, the fifth page) is not sent.

Subsequently, in the same manner, printing of the color K for the third page and of the color M for the fourth page is performed (SEQ131-3*d*, SEQ131-4*c*, SEQ132-3*d*, SEQ132-4*c*, SEQ134-3*d*, SEQ134-4*c*, SEQ135-3*d*, SEQ135-4*c*, SEQ133-3*d*, and SEQ133-4*c*). Lastly, printing of the color K for the fourth page is performed (SEQ131-4*d*, SEQ132-4*d*, SEQ134-4*d*, SEQ135-4*d*, and SEQ133-4*d*).

By the printing process up to this point, printing on 2 to 4 pages are completed for all colors Y, C, M, and K. The paper conveyance control unit 22 requests the conveyance control unit 51 to stop the conveyance of the printing paper (SEQ 142).

According to the present embodiment described above, data transfer control units 30*a*, 30*b*, 30*c* and 30*d* that control the data transmission of the colors Y, C, M, and K, respectively are independently configured from each other. In addition, the printing device controller 14 and each of the data transmission control units 30*a*, 30*b*, 30*c*, and 30*d* are connected to each other through the engine I/F control lines 40*a*, 40*b*, 40*c*, and 40*d*, respectively, so that in regard to communication between the printing device controller 14 and each of the data transfer control units 30*a*, 30*b*, 30*c*, and 30*d*, the data transfer control unit 30*a*, 30*b*, 30*c*, and 30*d* independently performs communication from each other.

In this way, it is possible to build a system in which paper conveyance control (printing device controller) and print data management (data transfer control unit) are independent to each other. This configuration allows an upper level device to directly transmit print data to a printer, so that a system that performs high speed data transfer can be built.

Furthermore, in the present embodiment, there is provided a system having a function of continuously conveying paper until printing of all pages under the on-going printing job is completed in a case where a trouble that can assure successful printing result occurs. According to this, improper printings such as redundant printing may be suppressed without requiring management of toner adhered to paper by a control unit (printing device controller) like the related art. Further, printing restarts faster after a recovery from a trouble.

According to the present invention, even in the system in which the sheet conveyance control is independent of the printing data management, there is no need to manage the printing status until the toner attaches onto the sheet, and no need to cancel the printing operation. Thereby, the improper printing such as the redundant printing can be advantageously prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing device comprising:
one or more data transfer control units that store image data transferred from an upper level device into a memory and reads out the image data from the memory in response to an instruction to start printing;
one or more printing units that print the data read out from the memory onto a recording medium;
an output control unit that outputs the image data read out from the memory by said one or more data transfer control units to a predetermined printing unit from among said one or more printing units; and
a printing control unit that instructs said one or more data transfer units to transfer the stored image data corresponding to one page to the output control unit, when a storage report of the image data corresponding to one page is sent from said one or more data transfer control units, and stops a conveyance of the recording medium after any of said one or more printing units completes the printing onto the recording medium under the printing in a case that a predetermined specific trouble occurs,
wherein:
the printing control unit instructs said one or more data transfer control units to transfer the image data in a case that a top position indicating a position where the printing of a page onto the recording medium is started reaches a printing position indicating a position where said one or more printing units perform the printing, by the conveyance of the recording medium,
a plurality of the data transfer control units are provided,
a plurality of the printing units are provided such that each printing unit corresponds to any of the data transfer control units, and each printing unit prints the image data read out from the memory by the corresponding data transfer control unit onto the recording medium page by page,
each of the data transfer control units transmits a page print complete report to the printing control unit, when the printing unit completes the printing page by page, and
the printing control unit requests, when the top position reaches the printing position, the data transfer control unit corresponding to the printing unit, of which the printing position is reached by the top position, to read out the image data, and when the specific trouble occurs, the printing control unit judges whether the printings by all the printing units are completed for a page under the printing by any of the printing units or for a page that is already printed by any of the printing units and is not yet printed by other printing units, on the basis of an existence of the page print completion report from each of the data transfer control units, and stops the conveyance of the recording medium after the printing is completed.

2. The printing device according to claim 1, wherein the recording medium is a continuous paper onto which the image data corresponding to a plurality of pages can be continuously printed.

3. The printing device according to claim 1, wherein the printing control unit stops the conveyance of the recording medium, before the printings is completed for a page under the printing by any of said one or more printing units, when the specific trouble occurs.

4. The printing device according to claim 1, wherein the specific trouble is a trouble capable of assuring a printing result even if continuing the printing after the trouble occurs.

5. The printing device according to claim 4, wherein the specific trouble includes a sheet size error and a jam in a discharge part.

6. A printing control method, comprising:
storing, by one or more data transfer control units, image data transferred from un upper level device into a memory and reading out the image data from the memory in response to an instruction to start printing;
printing, by one or more printing units, the data read out from the memory onto a recording medium;
outputting the image data read out from the memory by said one or more data transfer control units to a predetermined printing unit from among said one or more printing units; and
instructing said one or more data transfer units to transfer the stored image data corresponding to one page to the output control unit, when a storage report of the image data corresponding to one page is sent from said one or more data transfer control units; and
stopping a conveyance of the recording medium after any of said one or more printing units completes the printing onto the recording medium under the printing in a case that a predetermined specific trouble occurs,
wherein:
the instructing instructs said one or more data transfer control units to transfer the image data in a case that a top position indicating a position where the printing of a page onto the recording medium is started reaches a printing position indicating a position where said one or more printing units perform the printing, by the conveyance of the recording medium,
the one or more printing units comprises a plurality of printing units, and each of the plurality of printing units corresponds to any of the data transfer control units, and each minting unit prints the image data read out from the memory onto the recording medium page by a page,
the method further comprising:
transmitting a page print complete report to the printing control unit, when the printing unit completes the printing page by page; and
requesting, when the top position reaches the printing position, the data transfer control unit corresponding to the printing unit, of which the printing position is reached by the top position, to read out the image data, and judging, when the specific trouble occurs, whether the printings by all the printing units are completed for a page under the printing by any of the printing units or for a page that is already printed by any of the printing units and is not yet printed by other printing units, on the basis of an existence of the page print completion report from each of the data transfer control units, and stops the conveyance of the recording medium after the printing is completed.

* * * * *